US012671671B1

(12) United States Patent
Safa et al.

(10) Patent No.: US 12,671,671 B1
(45) Date of Patent: Jun. 30, 2026

(54) ADDRESS-DRIVEN SERVICES FOR ON-DEMAND CODE EXECUTION

(71) Applicant: Amazon Technologies, Inc., Seattle, WA (US)

(72) Inventors: Nashad Ahmed Safa, Bothell, WA (US); Prashant Kumar Singh, Seattle, WA (US); Kshitij Gupta, Seattle, WA (US); Ravi S Nagayach, Aurora, IL (US)

(73) Assignee: Amazon Technologies, Inc., Seattle, WA (US)

( * ) Notice: Subject to any disclaimer, the term of this patent is extended or adjusted under 35 U.S.C. 154(b) by 505 days.

(21) Appl. No.: 18/194,483

(22) Filed: Mar. 31, 2023

(51) Int. Cl.
| | |
|---|---|
| *G06F 15/177* | (2006.01) |
| *G06F 9/455* | (2018.01) |
| *G06F 9/54* | (2006.01) |
| *H04L 61/5007* | (2022.01) |

(52) U.S. Cl.
CPC ...... *H04L 61/5007* (2022.05); *G06F 9/45558* (2013.01); *G06F 9/547* (2013.01); *G06F 2009/4557* (2013.01); *G06F 2009/45595* (2013.01)

(58) Field of Classification Search
CPC . H04L 61/5007; G06F 9/45558; G06F 9/547; G06F 2009/4557; G06F 2009/45595
See application file for complete search history.

(56) References Cited

U.S. PATENT DOCUMENTS

| | | | |
|---|---|---|---|
| 4,949,254 | A | 8/1990 | Shorter |
| 5,283,888 | A | 2/1994 | Dao et al. |
| 5,835,764 | A | 11/1998 | Platt et al. |
| 5,970,488 | A | 10/1999 | Crowe et al. |
| 5,983,197 | A | 11/1999 | Enta |

(Continued)

FOREIGN PATENT DOCUMENTS

| | | |
|---|---|---|
| CA | 2975522 A1 | 8/2016 |
| CN | 1341238 A | 3/2002 |

(Continued)

OTHER PUBLICATIONS

Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on 2022-07-27] 795 pages.

(Continued)

*Primary Examiner* — John B Walsh
(74) *Attorney, Agent, or Firm* — Knobbe, Martens, Olson & Bear, LLP

(57) ABSTRACT

Systems and methods are provided for allowing service providers to take actions based on identifying a function invoker executing a function via an on-demand code execution service. The service provider may receive an IP address or header information from the on-demand code execution service along with information regarding a function invoked by a function invoker. The service provider may determine the function invoker based on reviewing the IP address or header information. Once identifying the function invoker, the service provider may take actions based at least on information regarding the function invoked and the function invoker.

20 Claims, 8 Drawing Sheets

(56) References Cited

U.S. PATENT DOCUMENTS

| | | |
|---|---|---|
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,640,574 B1 | 12/2009 | Kim et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,117,356 B1 | 2/2012 | Narad |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,713,093 B1 | 4/2014 | Upadhyay et al. |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,266 B1 | 8/2014 | Qu et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,949,457 B1 | 2/2015 | Theroux et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,026,658 B2 | 5/2015 | Xu et al. |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,130,900 B2 | 9/2015 | Tran |
| 9,141,410 B2 | 9/2015 | Leafe et al. |
| 9,141,947 B1 | 9/2015 | Furr et al. |
| 9,146,764 B1 | 9/2015 | Wagner |
| 9,152,406 B2 | 10/2015 | De et al. |
| 9,154,955 B1 | 10/2015 | Bertz et al. |
| 9,164,754 B1 | 10/2015 | Pohlack |
| 9,176,871 B1 | 11/2015 | Serlet |
| 9,183,019 B2 | 11/2015 | Kruglick |
| 9,189,778 B1 | 11/2015 | Sh. Al-Rashidi |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,565,190 B1 | 2/2017 | Telvik et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |

(56) References Cited

U.S. PATENT DOCUMENTS

| | | | |
|---|---|---|---|
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 | 10/2017 | Vermeulen et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,303,576 B1 | 5/2019 | Seymour et al. |
| 10,318,347 B1 | 6/2019 | Wagner |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 | 12/2019 | Naenko et al. |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,678,522 B1 | 6/2020 | Yerramreddy et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,740,149 B2 | 8/2020 | Bogineni et al. |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 10,956,244 B1 | 3/2021 | Cho |
| 11,010,188 B1 | 5/2021 | Brooker et al. |
| 11,016,815 B2 | 5/2021 | Wisniewski et al. |
| 11,044,198 B1 | 6/2021 | Ahn et al. |
| 11,082,333 B1 | 8/2021 | Lam et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,272,015 B2 | 3/2022 | Thum et al. |
| 11,314,547 B1 | 4/2022 | Tang et al. |
| 11,327,992 B1 | 5/2022 | Batsakis et al. |
| 11,354,169 B2 | 6/2022 | Marriner et al. |
| 11,360,793 B2 | 6/2022 | Wagner et al. |
| 11,392,497 B1 | 7/2022 | Brooker et al. |
| 11,394,636 B1 | 7/2022 | Walker et al. |
| 11,411,771 B1 | 8/2022 | Dawani et al. |
| 11,461,124 B2 | 10/2022 | Wagner et al. |
| 11,467,890 B2 | 10/2022 | Wagner |

(56) References Cited

U.S. PATENT DOCUMENTS

| | | |
|---|---|---|
| 11,550,713 B1 | 1/2023 | Piwonka et al. |
| 11,561,811 B2 | 1/2023 | Wagner |
| 11,593,270 B1 | 2/2023 | Brooker et al. |
| 11,656,892 B1 | 5/2023 | Harris et al. |
| 11,714,675 B2 | 8/2023 | Brooker et al. |
| 11,778,053 B1 | 10/2023 | Allen |
| 11,816,504 B2 | 11/2023 | Bogineni et al. |
| 11,843,517 B1 | 12/2023 | Prateek et al. |
| 11,966,303 B2 | 4/2024 | Mason et al. |
| 11,966,308 B2 | 4/2024 | Hicks et al. |
| 12,056,515 B1 | 8/2024 | Mills et al. |
| 12,063,166 B1 | 8/2024 | Samba et al. |
| 12,081,629 B1 | 9/2024 | Wei et al. |
| 12,177,110 B1 | 12/2024 | Choudhry et al. |
| 12,381,878 B1 | 8/2025 | Gupta et al. |
| 12,476,978 B2 | 11/2025 | Rajagopal et al. |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0282330 A1 | 12/2006 | Frank et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-Yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |

(56) References Cited

U.S. PATENT DOCUMENTS

| | | |
|---|---|---|
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0252430 A1 | 10/2011 | Chapman et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1 | 12/2012 | Paleja et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132283 A1 | 5/2013 | Hayhow et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0181998 A1 | 7/2013 | Malakapalli et al. |
| 2013/0185719 A1 | 7/2013 | Kar et al. |
| 2013/0185729 A1 | 7/2013 | Vasic et al. |
| 2013/0191847 A1 | 7/2013 | Sirota et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Lorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |

(56) References Cited

U.S. PATENT DOCUMENTS

| | | |
|---|---|---|
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0109092 A1 | 4/2014 | Jacobson et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0025989 A1 | 1/2015 | Dunstan |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0206139 A1 | 7/2015 | Lea |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Saladi et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |

(56)                References Cited

U.S. PATENT DOCUMENTS

| | | |
|---|---|---|
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0072781 A1 | 3/2016 | Zhang et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0285278 A1 | 10/2017 | Ota |
| 2017/0286187 A1 | 10/2017 | Chen et al. |
| 2017/0286278 A1* | 10/2017 | Thomas ................. G06F 21/52 |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0322824 A1 | 11/2017 | Reuther et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0113793 A1 | 4/2018 | Fink et al. |
| 2018/0121665 A1 | 5/2018 | Anderson et al. |
| 2018/0129684 A1 | 5/2018 | Wilson et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0165110 A1 | 6/2018 | Htay |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0367517 A1 | 12/2018 | Tus |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson et al. |
| 2019/0034095 A1 | 1/2019 | Singh et al. |
| 2019/0043231 A1 | 2/2019 | Uzgin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0147515 A1 | 5/2019 | Hurley et al. |
| 2019/0171423 A1 | 6/2019 | Mishra et al. |
| 2019/0179678 A1 | 6/2019 | Banerjee et al. |
| 2019/0179684 A1 | 6/2019 | On et al. |
| 2019/0179725 A1 | 6/2019 | Mital et al. |
| 2019/0180036 A1 | 6/2019 | Shukla |
| 2019/0188288 A1 | 6/2019 | Holm et al. |

(56) References Cited

U.S. PATENT DOCUMENTS

| | | | |
|---|---|---|---|
| 2019/0235848 A1 | 8/2019 | Swiecki et al. | |
| 2019/0238590 A1 | 8/2019 | Talukdar et al. | |
| 2019/0250937 A1 | 8/2019 | Thomas et al. | |
| 2019/0268152 A1 | 8/2019 | Sandoval et al. | |
| 2019/0278938 A1 | 9/2019 | Greene et al. | |
| 2019/0286475 A1 | 9/2019 | Mani | |
| 2019/0286492 A1 | 9/2019 | Gulsvig Wood et al. | |
| 2019/0303117 A1 | 10/2019 | Kocberber et al. | |
| 2019/0311115 A1 | 10/2019 | Lavi et al. | |
| 2019/0318312 A1 | 10/2019 | Foskett et al. | |
| 2019/0320038 A1 | 10/2019 | Walsh et al. | |
| 2019/0324813 A1 | 10/2019 | Bogineni et al. | |
| 2019/0339955 A1 | 11/2019 | Kuo et al. | |
| 2019/0361802 A1 | 11/2019 | Li et al. | |
| 2019/0363885 A1 | 11/2019 | Schiavoni et al. | |
| 2019/0370113 A1 | 12/2019 | Zhang et al. | |
| 2020/0007456 A1 | 1/2020 | Greenstein et al. | |
| 2020/0026527 A1 | 1/2020 | Xu et al. | |
| 2020/0028936 A1 | 1/2020 | Gupta et al. | |
| 2020/0034471 A1 | 1/2020 | Danilov et al. | |
| 2020/0065079 A1 | 2/2020 | Kocberber et al. | |
| 2020/0073770 A1 | 3/2020 | Mortimore, Jr. et al. | |
| 2020/0073987 A1 | 3/2020 | Perumala et al. | |
| 2020/0081745 A1 | 3/2020 | Cybulski et al. | |
| 2020/0110691 A1 | 4/2020 | Bryant et al. | |
| 2020/0120120 A1 | 4/2020 | Cybulski | |
| 2020/0134030 A1 | 4/2020 | Natanzon et al. | |
| 2020/0136933 A1 | 4/2020 | Raskar | |
| 2020/0153798 A1 | 5/2020 | Liebherr | |
| 2020/0153897 A1 | 5/2020 | Mestery et al. | |
| 2020/0167208 A1 | 5/2020 | Floes et al. | |
| 2020/0192646 A1 | 6/2020 | Yerramreddy et al. | |
| 2020/0213151 A1 | 7/2020 | Srivatsan et al. | |
| 2020/0213359 A1 | 7/2020 | Arbel et al. | |
| 2020/0241930 A1 | 7/2020 | Garg et al. | |
| 2020/0327236 A1 | 10/2020 | Pratt et al. | |
| 2020/0348979 A1 | 11/2020 | Calmon | |
| 2020/0349067 A1 | 11/2020 | Syamala et al. | |
| 2020/0366587 A1 | 11/2020 | White et al. | |
| 2020/0401455 A1 | 12/2020 | Church et al. | |
| 2021/0019056 A1 | 1/2021 | Mangione-Tran | |
| 2021/0081233 A1 | 3/2021 | Mullen et al. | |
| 2021/0117534 A1 | 4/2021 | Maximov et al. | |
| 2021/0124822 A1 | 4/2021 | Tiwary et al. | |
| 2021/0176333 A1 | 6/2021 | Coleman et al. | |
| 2021/0294646 A1 | 9/2021 | Hassaan et al. | |
| 2021/0311758 A1 | 10/2021 | Cao et al. | |
| 2021/0314388 A1* | 10/2021 | Zhou .................... | H04L 61/103 |
| 2022/0012083 A1 | 1/2022 | Brooker et al. | |
| 2022/0147400 A1 | 5/2022 | Cowan | |
| 2022/0214863 A1 | 7/2022 | Clement et al. | |
| 2022/0391238 A1 | 12/2022 | Wagner | |
| 2023/0024699 A1 | 1/2023 | Bayoumi et al. | |
| 2023/0033818 A1 | 2/2023 | Baughman et al. | |
| 2023/0142895 A1 | 5/2023 | Campbell et al. | |
| 2023/0359508 A1 | 11/2023 | Kalley et al. | |
| 2023/0409412 A1* | 12/2023 | Kruegel ................. | G06F 9/541 |
| 2024/0160461 A1 | 5/2024 | Nanda et al. | |
| 2025/0080416 A1 | 3/2025 | Mitrache et al. | |
| 2025/0110800 A1 | 4/2025 | Rajagopal et al. | |
| 2025/0112929 A1 | 4/2025 | Rajagopal et al. | |

FOREIGN PATENT DOCUMENTS

| | | | |
|---|---|---|---|
| CN | 101002170 A | 7/2007 | |
| CN | 101267334 A | 9/2008 | |
| CN | 101345757 A | 1/2009 | |
| CN | 101496005 A | 7/2009 | |
| CN | 101627388 A | 1/2010 | |
| CN | 101640700 A | 2/2010 | |
| CN | 101764824 A | 6/2010 | |
| CN | 102171712 A | 8/2011 | |
| CN | 102246152 A | 11/2011 | |
| CN | 102365858 A | 2/2012 | |
| CN | 102420846 A | 4/2012 | |
| CN | 102761549 A | 10/2012 | |
| CN | 103098027 A | 5/2013 | |
| CN | 103140828 A | 6/2013 | |
| CN | 103384237 A | 11/2013 | |
| CN | 103731427 A | 4/2014 | |
| CN | 104111848 A | 10/2014 | |
| CN | 104160378 A | 11/2014 | |
| CN | 104243479 A | 12/2014 | |
| CN | 104903854 A | 9/2015 | |
| CN | 105122243 A | 12/2015 | |
| CN | 105956000 A | 9/2016 | |
| CN | 106921651 A | 7/2017 | |
| CN | 107534672 A | 1/2018 | |
| CN | 114208112 A | 3/2022 | |
| EP | 2663052 A1 | 11/2013 | |
| EP | 3508975 A1 | 7/2019 | |
| JP | 2002-287974 A | 10/2002 | |
| JP | 2006-107599 A | 4/2006 | |
| JP | 2007-080161 A | 3/2007 | |
| JP | 2007-538323 A | 12/2007 | |
| JP | 2010-026562 A | 2/2010 | |
| JP | 2011-065243 A | 3/2011 | |
| JP | 2011-233146 A | 11/2011 | |
| JP | 2011-257847 A | 12/2011 | |
| JP | 2012-078893 A | 4/2012 | |
| JP | 2012-104150 A | 5/2012 | |
| JP | 2013-156996 A | 8/2013 | |
| JP | 2014-525624 A | 9/2014 | |
| JP | 2016-507100 A | 3/2016 | |
| JP | 2017-534107 A | 11/2017 | |
| JP | 2017-534967 A | 11/2017 | |
| JP | 2018-503896 A | 2/2018 | |
| JP | 2018-512087 A | 5/2018 | |
| JP | 2018-536213 A | 12/2018 | |
| KR | 10-357850 B1 | 10/2002 | |
| WO | WO 2008/114454 A1 | 9/2008 | |
| WO | WO 2009/137567 A1 | 11/2009 | |
| WO | WO 2012/039834 A1 | 3/2012 | |
| WO | WO 2012/050772 A1 | 4/2012 | |
| WO | WO 2013/106257 A1 | 7/2013 | |
| WO | WO 2015/078394 A1 | 6/2015 | |
| WO | WO 2015/108539 A1 | 7/2015 | |
| WO | WO 2015/149017 A1 | 10/2015 | |
| WO | WO 2016/053950 A1 | 4/2016 | |
| WO | WO 2016/053968 A1 | 4/2016 | |
| WO | WO 2016/053973 A1 | 4/2016 | |
| WO | WO 2016/090292 A1 | 6/2016 | |
| WO | WO 2016/126731 A1 | 8/2016 | |
| WO | WO 2016/164633 A1 | 10/2016 | |
| WO | WO 2016/164638 A1 | 10/2016 | |
| WO | WO 2017/059248 A1 | 4/2017 | |
| WO | WO 2017/112526 A1 | 6/2017 | |
| WO | WO 2017/172440 A1 | 10/2017 | |
| WO | WO 2018/005829 A1 | 1/2018 | |
| WO | WO 2018/039514 A1 | 1/2018 | |
| WO | WO 2018/098443 A1 | 5/2018 | |
| WO | WO 2018/098445 A1 | 5/2018 | |
| WO | WO 2020/005764 A1 | 1/2020 | |
| WO | WO 2020/006081 A1 | 1/2020 | |
| WO | WO 2020/069104 A1 | 4/2020 | |
| WO | WO 2020/123439 A1 | 6/2020 | |
| WO | WO 2020/264431 A1 | 12/2020 | |
| WO | 2021/127577 A1 | 6/2021 | |
| WO | WO 2021/108435 A1 | 6/2021 | |
| WO | WO 2023/107649 A1 | 6/2023 | |

OTHER PUBLICATIONS

Anonymous: "Amazon Cognito Developer Guide," Jun. 24, 2001, XP093030075, retrieved from the internet: URL:https://web.archive.org/web/20210624153941if_/https://docs.aws.amazon.com/cognito/latest/developerguide/cognito-dg.pdf [retrieved on Mar. 9, 23] the whole document.

Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/

(56) References Cited

OTHER PUBLICATIONS latest/developerguide/swf-dg.pdf [retrieved on 2022-07-28] in 197 pages.

Anonymous: "alias (command)—Wikipedia," Jun. 28, 2016, p. 106, XP093089956, Retrieved from the Internet: URL:https://en.wikipedia. org/w/index.php?title=Alias_(command)&oldid=727315645 [retrieved on Oct. 9, 2023].

Anonymous: "AWS Flow Framework for Java," Apr. 7, 2016 (Apr. 7, 2016), XP055946535, Retrieved from the Internet: URL:https:// web.archive.org/web/20160407214715if_/http://docs.aws.amazon. com/amazonswf/latest/awsflowguide/swf-aflow.pdf, [retrieved Jul. 27, 2022] in 139 pages.

Anonymous: "AWS Lambda Developer Guide," Jul. 1, 2021, XP093024770, retrieved from the internet: URL:https://web.archieve. org/web/20210701100128if_/https://docs.aws.amazon.com/lambda/ latest/dg/lambda-dg.pdf [retrieved on Feb. 17, 23] the whole document.

Anonymous: "AWS Lambda Developer Guide," Jul. 1, 2021, XP093024770, retrieved from the internet: URL:https://web.archieve. org/web/20210701100128if_/https://docs.aws.amazon.com/lambda/ latest/dg/lambda-dg.pdf [retrieved on Feb. 17, 2023] the whole document.

Anonymous: "Docker run reference", Dec. 7, 2015, XP055350246, Retrieved from the Internet:URL:https://web.archive.org/web/ 20151207111702/https://docs.docker.com/engine/reference/run/ [retrieved on Feb. 28, 2017].

Anonymous: SaaS Tenant Isolution Strategies Isolating Resources in a Multi-Tenant Environment,: Aug. 1, 2020, XP093030095, retrieved from the internet: URL:https://dl.awsstatic.com/whitepapers/ saas-tenant-isolation-strategies.pdf [retrieved on Mar. 9, 2023] the whole document.

Anonymous: "Security Overview of AWS Lambda," Aug. 11, 2021, XP093030100, retrieved from the internet:URL:https://web.archive. org/web/20210811044132if_/https://docs.aws.amazon.com/whitepapers/ latest/security-overview-aws-lambda/security-overview-aws-lambda. pdf [retrieved Mar. 9, 2023] the whole document.

Abebe et al., "EC-Store: Bridging the Gap Between Storage and Latency in Distribute Erasure CodedSystems", IEEE 38th International Conference on Distributed Computing Systems, Jul. 2018, pp. 255-266.

Adapter Pattern, Wikipedia,https://en.wikipedia.org/w/index.php? title=Adapter_pattern&oldid=654971255, [retrieved May 26, 2016], 6 pages.

Amazon, "AWS Lambda: Developer Guide", Jun. 26, 2016 Retrieved from the Internet,URL:http://docs.aws.amazon.com/lambda/latest/ dg/lambda-dg.pdf, [retrieved on Aug. 30, 2017], 314 pages.

Amazon, "AWS Lambda: Developer Guide", Apr. 30, 2016 Retrieved from the Internet, URL:https://web.archive.org/web/20160430050158/ http://docs.aws.amazon.com:80/lambda/latest/dg/lambda-dg.pdf, 346 pages.

Amazon, "AWS Lambda: Developer Guide", Retrieved from the Internet, Feb. 2019, URL : http://docs.aws.amazon.com/lambda/ latest/dg/lambda-dg.pdf, 521 pages.

Balazinska et al., Moirae: History-Enhanced Monitoring, Published: Jan. 2007, 12 pages.

Bebenita et al., "Trace-Based Compilation in Execution Environments without Interpreters," ACM, Copyright Sep. 15, 2010, 10 pages.

Ben-Yehuda et al., "Deconstructing Amazon EC2 Spot Instance Pricing", ACM Transactions on Economics and Computation 1.3, Sep. 2013, 15 pages.

Bhadani et al., Performance evaluation of web servers using central load balancing policy over virtual machines on cloud, Jan. 2010, 4 pages.

Bryan Liston, "Ad Hoc Big Data Processing Made Simple with Serverless Map Reduce", Nov. 4, 2016, Amazon Web Services <https :/laws. amazon .com/bl ogs/compute/ad-hoc-big-data-processi ng-made-si mple-with-serverless- mapred uce >.

CodeChef ADMIN discussion web page, retrieved from https:// discuss.codechef.com/t/what-are-the-memory-limit-and-stack-size-on-codechef/14159, retrieved on Sep. 10, 2019.

CodeChef IDE web page, Code, Compile & Run, retrieved from https://www.codechef.com/ide, retrieved on Sep. 9, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, Nov. 2014, 13 pages.

Deis, Container, Jun. 2014, 1 page.

Dean et al., "MapReduce: Simplified Data Processing on Large Clusters", ACM, Jan. 1, 2008, pp. 107-113.

Dombrowski, M., et al., Dynamic Monitor Allocation in the Java Virtual Machine, JTRES '13, Oct. 9-11, 2013, pp. 30-37.

Dornemann et al., "On-Demand Resource Provisioning for BPEL Workflows Using Amazon's ElasticCompute Cloud", 9th IEEE/ ACM International Symposium on Cluster Computing and the Grid, May 2009, pp. 140-147.

Dynamic HTML, Wikipedia page from date Mar. 27, 2015, retrieved using the WayBackMachine, fromhttps://web.archive.org/web/ 20150327215418/https://en.wikipedia.org/wiki/Dynamic_HTML, 2015, 6 pages.

Ekanayake et al, "Twister: A Runtime for Iterative MapReduce", ACM, Jun. 2010, pp. 810-818.

Espadas, J., et al., A Tenant-Based Resource Allocation Model for Scaling Software-as-a-ServiceApplications Over Cloud Computing Infrastructures, Future Generation Computer Systems, vol. 29, pp. 273-286, Jan. 1, 2013.

Fan et al., Online Optimization of VM Deployment in IaaS Cloud, Dec. 17, 2012-Dec. 19, 2012, 6 pages.

Ha et al., A Concurrent Trace-based Just-In-Time Compiler for Single-threaded JavaScript, utexas.edu, Jun. 2009.

Hammoud et al, "Locality-Aware Reduce Task Scheduling for MapReduce", IEEE, Nov. 29, 2011, pp. 570-576.

Han et al., Lightweight Resource Scaling for Cloud Applications, May 13, 2012 - May 16, 2012, 8 pages.

Hoffman, Auto scaling your website with Amazon Web Services (AWS)—Part 2, Cardinalpath, Sep. 2015, 15 pages.

http://discuss.codechef.com discussion web page from date Nov. 11, 2012, retrieved using the WayBackMachine, from https://web. archive.org/web/20121111040051/http://discuss.codechef.com/ questions/2881 /why-are-simple-java-programs-using-up-so-much-space, 2012.

https://www.codechef.com code error help page from Jan. 2014, retrieved from https://www.codechef.com/JAN14/status/ERROR, va123, 2014.

http://www.codechef.com/ide web page from date Apr. 5, 2015, retrieved using the WayBackMachine, from https://web.archive.org/ web/20150405045518/http://www.codechef.com/ide, 2015.

Huang, Zhe, Danny HK Tsang, and James She. "A virtual machine consolidation framework formapreduce enabled computing clouds." 2012 24th International Teletraffic Congress (ITC 24). IEEE, Sep. 4, 2012-Sep. 7, 2012.

Huang et al., "Erasure Coding in Windows Azure Storage", USENIX, Jun. 13, 2012 in 12 pages.

Kamga et al., Extended scheduler for efficient frequency scaling in virtualized systems, Jul. 2012, 8 pages.

IBM, what is Serverless computing, https://www.ibm.com/topics/ serverless#:-:test=Serverless%20is%20a%20cloud% 20computing,managing%20servers%20or%20backend%20infra-structure, pp. 1-11 (retrieved Aug. 2023).

Kato, et al. "Web Service Conversion Architecture of the Web Application and Evaluation"; Research Report from Information Processing Society, Apr. 3, 2006 with Machine Translation.

Kazempour et al., AASH: an asymmetry-aware scheduler for hypervisors, Jul. 2010, 12 pages.

Kim et al, "MRBench: A Benchmark for Map-Reduce Framework", IEEE, Dec. 8, 2008, pp. 11-18.

Kraft et al., 10 performance prediction in consolidated virtualized environments, Mar. 2011, 12 pages.

Krsul et al., "VMPlants: Providing and Managing Virtual Machine Execution Environments for GridComputing", Supercomputing,

(56)          References Cited

OTHER PUBLICATIONS

2004. Proceedings of the ACM/IEEESC 2004 Conference Pittsburgh, PA, XP010780332, Nov. 6-12, 2004, 12 pages.

Lagar-Cavilla et al., "SnowFlock: Virtual Machine Cloning as a First-Class Cloud Primitive", ACMTransactions on Computer Systems, vol. 29, No. 1, Article 2, Publication date: Feb. 2011, in 45 pages.

Lin, "MR-Apriori: Association Rules Algorithm Based on MapReduce", IEEE, Jun. 2014, pp. 141-144.

Meng et al., Efficient resource provisioning in compute clouds via VM multiplexing, Jun. 2010, 10 pages.

Merkel, "Docker: Lightweight Linux Containers for Consistent Development and Deployment", LinuxJournal, vol. 2014 Issue 239, Mar. 2014, XP055171140, 16 pages.

Monteil, Coupling profile and historical methods to predict execution time of parallel applications Parallel and Cloud Computing, Jul. 2013, <hal-01228236, pp. 81-89.

Nakajima, J., et al., Optimizing Virtual Machines Using Hybrid Virtualization, SAC '11, Mar. 21-25, 2011, TaiChung, Taiwan, pp. 573-578.

Neenan, Sarah Compare Serverless tools and services in the Public cloud, https://www.techtarget.com/searchcloudcomputing/feature/Compare-serverless-tools-and-services-in-the-public-cloud, TechTarget, pp. 1-4 (Year: Feb. 2020).

Qian, H., and D. Medhi, et al., Estimating Optimal Cost of Allocating Virtualized Resources With Dynamic Demand, ITC 2011, Sep. 2011, pp. 320-321.

Rashmi et al., "EC-Cache: Load-Balance, Low-Latency Cluster Caching with Online Erasure Coding", USENIX, Nov. 2, 2016, pp. 401-417.

Ryden et al., "Nebula: Distributed Edge Cloud for Data-Intensive Computing", IEEE, Mar. 2014, pp. 491-492.

Sakamoto, et al. "Platform for Web Services using Proxy Server"; Research Report from Information Processing Society, Mar. 22, 2002, vol. 2002, No. 31.

Search Query Report from IP.com, performed Dec. 2, 2020.

Search Query Report from IP.com, performed May 27, 2021.

Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.

Shim (computing), Wikipedia,https://en.wikipedia.org/w/index.php?title+Shim_(computing)&oldid+654971528, [retrieved on May 26, 2016], 2 pages.

Stack Overflow, Creating a database connection pool, Nov. 10, 2009, 4 pages.

Tan et al., Provisioning for large scale cloud computing services, Jun. 2012, 2 pages.

Tange, "GNU Parallel: The Command-Line Power Tool", vol. 36, No. 1, Jan. 1, 1942, pp. 42-47.

Vaghani, S.B., Virtual Machine File System, Acm Sigops Operating Systems Review 44(4):57-70, Dec. 2010.

Vaquero, L., et al., Dynamically Scaling Applications in the cloud, Acm Sigcomm Computer Communication Review 41(1):45-52, Jan. 2011.

Wang et al., "Improving utilization through dynamic VM resource allocation in hybrid cloudenvironment", Parallel and Distributed V Systems (ICPADS), IEEE, Dec. 16, 2014-Dec. 19, 2014. Retrieved on Feb. 14, 2019, Retrieved from the internet: URL<https://ieeexplore.ieee.org/stamp/stamp.jsp?tp=&arnumber=7097814, 8 pages.

Wikipedia "API" pages from date Apr. 7, 2015, retrieved using the WayBackMachine from https://web.archive.org/web/20150407191158/https://en .wikipedia.org/wiki/Application_programming_interface.

Wikipedia List_of_HTTP status_codes web page, retrieved from https://en.wikipedia.org/wiki/List_of_HTTP status_codes, retrieved on Sep. 10, 2019.

Wikipedia Recursion web page from date Mar. 26, 2015, retrieved using the WayBackMachine, fromhttps://web.archive.org/web/20150326230100/https://en .wikipedia.org/wiki/Recursion_(computer science), 2015.

Wikipedia: Serverless computing, https://en.wikipedia.org/wiki/Serverless_computing, p. 107 (Retreived Aug. 2023).

Wikipedia subroutine web page, retrieved from https://en.wikipedia.org/wiki/Subroutine, retrieved on Sep. 10, 2019.

Wood, Timothy, et al. "Cloud Net: dynamic pooling of cloud resources by live WAN migration of virtual Machines." ACM Sigplan Notices 46.7 (2011): 121-132. (Year: Jul. 2011).

Wu et al., HC-Midware: A Middleware to Enable High Performance Communication System Simulation in Heterogeneous Cloud, Association for Computing Machinery, Oct. 20-22, 2017, 10 pages.

Yamasaki et al. "Model-based resource selection for efficient virtual cluster deployment", Virtualization Technology in Distributed Computing, ACM, Nov. 2007, pp. 1-7.

Yang, The Application of MapReduce in the Cloud Computing:, IEEE, Oct. 2011, pp. 154-156.

Yue et al., AC 2012-4107: Using Amazon EC2 in Computer and Network Security Lab Exercises: Design, Results, and Analysis, 2012, American Society for Engineering Education, Jun. 10, 2012.

Zhang et al., VMThunder: Fast Provisioning of Large-Scale Virtual Machine Clusters, IEEETransactions on Parallel and Distributed Systems, vol. 25, No. 12, Dec. 2014, pp. 3328-3338.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Preliminary Report on Patentability in PCT/US2015/052810 dated Apr. 4, 2017.

Extended Search Report in European Application No. 15846932.0 dated May 3, 2018.

International Search Report and Written Opinion in PCT/US2015/052838 dated Dec. 18, 2015.

International Preliminary Report on Patentability in PCT/US2015/052838 dated Apr. 4, 2017.

Extended Search Report in European Application No. 15847202.7 dated Sep. 9, 2018.

Extended Search Report in European Application No. 19199402.9 dated Mar. 6, 2020.

International Search Report and Written Opinion in PCT/US2015/052833 dated Jan. 13, 2016.

International Preliminary Report on Patentability in PCT/US2015/052833 dated Apr. 4, 2017.

Extended Search Report in European Application No. 15846542.7 dated Aug. 27, 2018.

International Search Report and Written Opinion in PCT/US2015/064071dated Mar. 16, 2016

International Preliminary Report on Patentability in PCT/US2015/064071 dated Jun. 6, 2017.

International Search Report and Written Opinion in PCT/US2016/016211 dated Apr. 13, 2016.

International Preliminary Report on Patentability in PCT/US2016/016211 dated Aug. 17, 2017.

European Examination Report, re EP Application No. 17743108.7, dated Oct. 12, 2022.

International Search Report and Written Opinion in PCT/US2016/026514 dated Jun. 8, 2016.

International Preliminary Report on Patentability in PCT/US2016/026514 dated Oct. 10, 2017.

International Search Report and Written Opinion in PCT/US2016/026520 dated Jul. 5, 2016.

International Preliminary Report on Patentability in PCT/US2016/026520 dated Oct. 10, 2017.

International Search Report and Written Opinion in PCT/US2016/054774 dated Dec. 16, 2016.

International Preliminary Report on Patentability in PCT/US2016/054774 dated Apr. 3, 2018.

International Search Report and Written Opinion in PCT/US2016/066997 dated Mar. 20, 2017.

(56) References Cited

OTHER PUBLICATIONS

International Preliminary Report on Patentability in PCT/US2016/066997 dated Jun. 26, 2018.

International Search Report and Written Opinion in PCT/US/2017/023564 dated Jun. 6, 2017.

International Preliminary Report on Patentability in PCT/US/2017/023564 dated Oct. 2, 2018.

International Search Report and Written Opinion in PCT/US2017/040054 dated Sep. 21, 2017.

International Preliminary Report on Patentability in PCT/US2017/040054 dated Jan. 1, 2019.

International Search Report and Written Opinion in PCT/US2017/039514 dated Oct. 10, 2017.

International Preliminary Report on Patentability in PCT/US2017/039514 dated Jan. 1, 2019.

Extended European Search Report in application No. 17776325.7 dated Oct. 23, 2019.

International Search Report and Written Opinion mailed Oct. 15, 2019 for International Application No. PCT/US2019/039246 in 16 pages.

International Preliminary Report on Patentability mailed Dec. 29, 2020 for International Application No. PCT/US2019/039246 in 8 pages.

International Search Report for Application No. PCT/US2019/038520 dated Aug. 14, 2019.

International Preliminary Report on Patentability for Application No. PCT/US2019/038520 dated Dec. 29, 2020.

International Preliminary Report on Patentability and Written Opinion in PCT/US2019/053123 dated Mar. 23, 2021.

International Search Report and Written Opinion in PCT/US2019/053123 dated Jan. 7, 2020.

International Search Report for Application No. PCT/US2019/065365 dated Mar. 19, 2020.

International Preliminary Report on Patentability for Application No. PCT/US2019/065365 dated Jun. 8, 2021.

International Search Report for Application No. PCT/US2020/039996 dated Oct. 8, 2020.

International Preliminary Report on Patentability for Application No. PCT/US2020/039996 dated Jan. 6, 2022.

International Search Report for Application No. PCT/US2020/062060 dated Mar. 5, 2021.

International Preliminary Report on Patentability for Application No. PCT/US2020/062060 dated Jun. 9, 2022 in 9 pages.

International search Report and written opinion received for PCT application No. PCT/US2024/048187, mailed on Jan. 30, 2025, 9 pages.

International search Report and written opinion received for PCT application No. PCT/US2024/048189, mailed on Jan. 24, 2025, 11 pages.

* cited by examiner

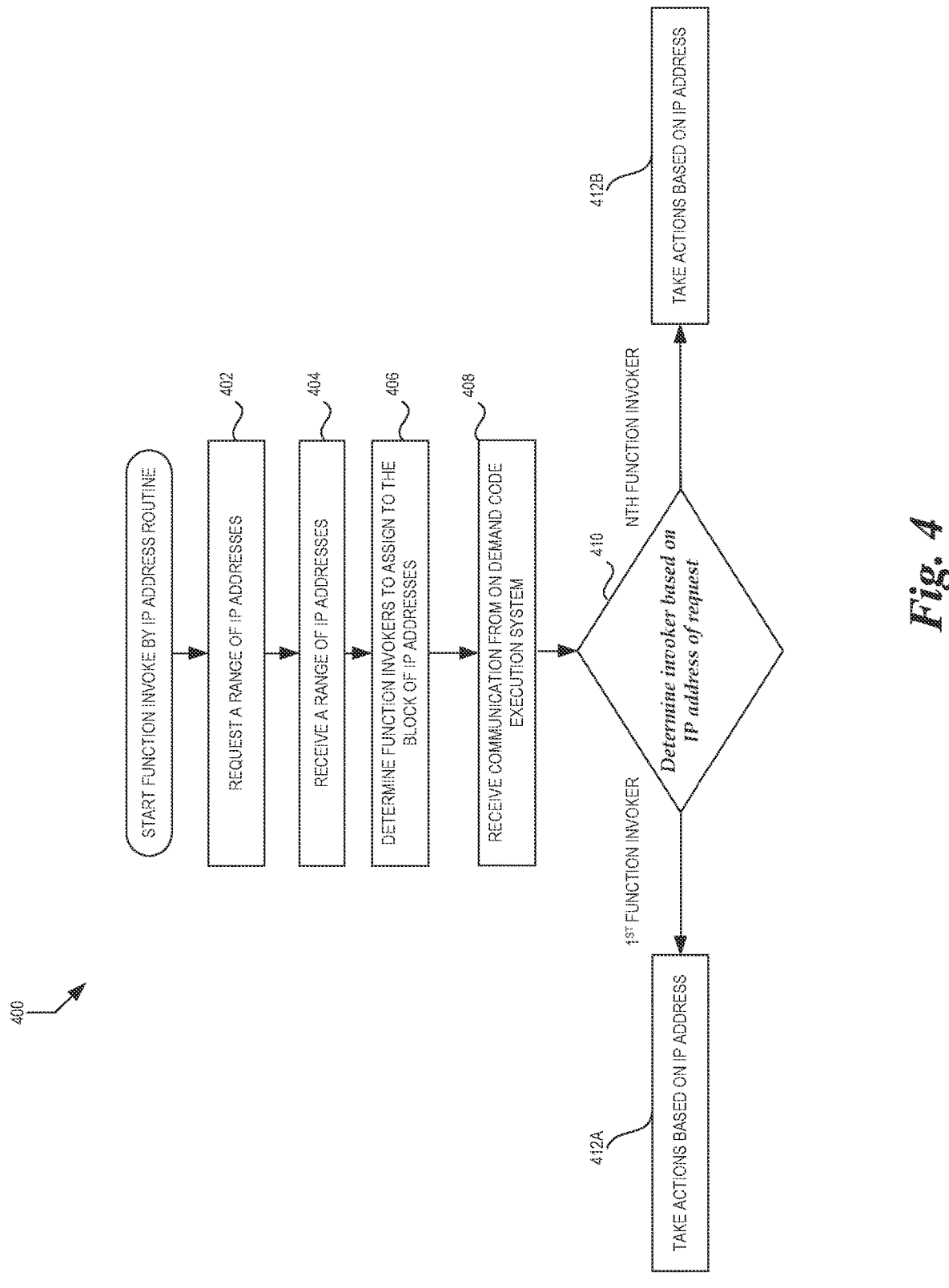

400

START FUNCTION INVOKE BY IP ADDRESS ROUTINE

402
REQUEST A RANGE OF IP ADDRESSES

404
RECEIVE A RANGE OF IP ADDRESSES

406
DETERMINE FUNCTION INVOKERS TO ASSIGN TO THE BLOCK OF IP ADDRESSES

408
RECEIVE COMMUNICATION FROM ON DEMAND CODE EXECUTION SYSTEM

410
Determine invoker based on IP address of request

1ST FUNCTION INVOKER

NTH FUNCTION INVOKER

412A
TAKE ACTIONS BASED ON IP ADDRESS

412B
TAKE ACTIONS BASED ON IP ADDRESS

Fig. 4

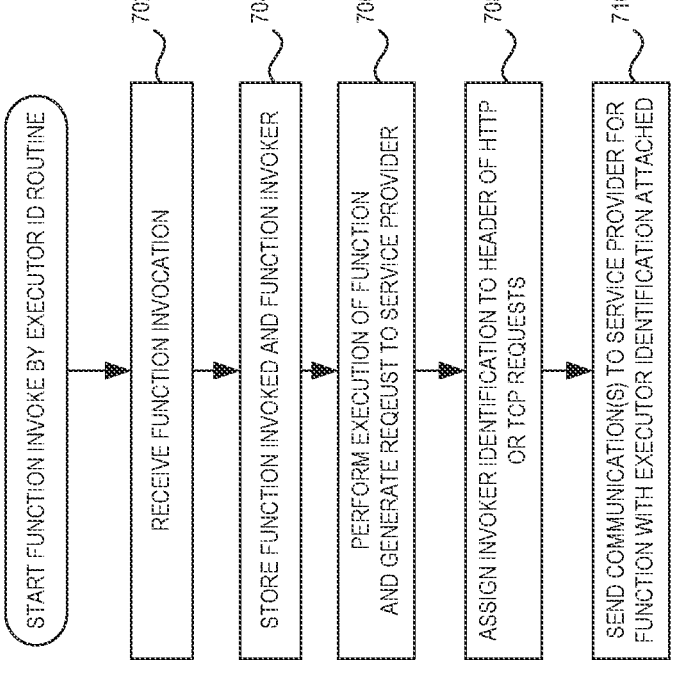
702 — START FUNCTION INVOKE BY EXECUTOR ID ROUTINE
702 — RECEIVE FUNCTION INVOCATION
704 — STORE FUNCTION INVOKED AND FUNCTION INVOKER
706 — PERFORM EXECUTION OF FUNCTION AND GENERATE REQEUST TO SERVICE PROVIDER
708 — ASSIGN INVOKER IDENTIFICATION TO HEADER OF HTTP OR TCP REQUESTS
710 — SEND COMMUNICATION(S) TO SERVICE PROVIDER FOR FUNCTION WITH EXECUTOR IDENTIFICATION ATTACHED
700
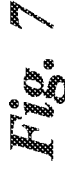
*Fig. 7*

ADDRESS-DRIVEN SERVICES FOR ON-DEMAND CODE EXECUTION

BACKGROUND

Computing systems can utilize communication networks to exchange data. In some implementations, a computing system can receive and process data provided by another computing system. For example, a computing system can receive data entered using another computing system, store the data, process the data, and so on.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 4 is a flow diagram of an illustrative routine for service providers to acquire IP addresses for the on-demand code execution system and assign the IP addresses to function invokers and then take actions based on IP addresses during function processing according to some embodiments.

FIG. 7 is a flow diagram of an illustrative routine for taking actions based on identifying function invokers during on-demand function processing according to some embodiments.

DETAILED DESCRIPTION

Figure 1:
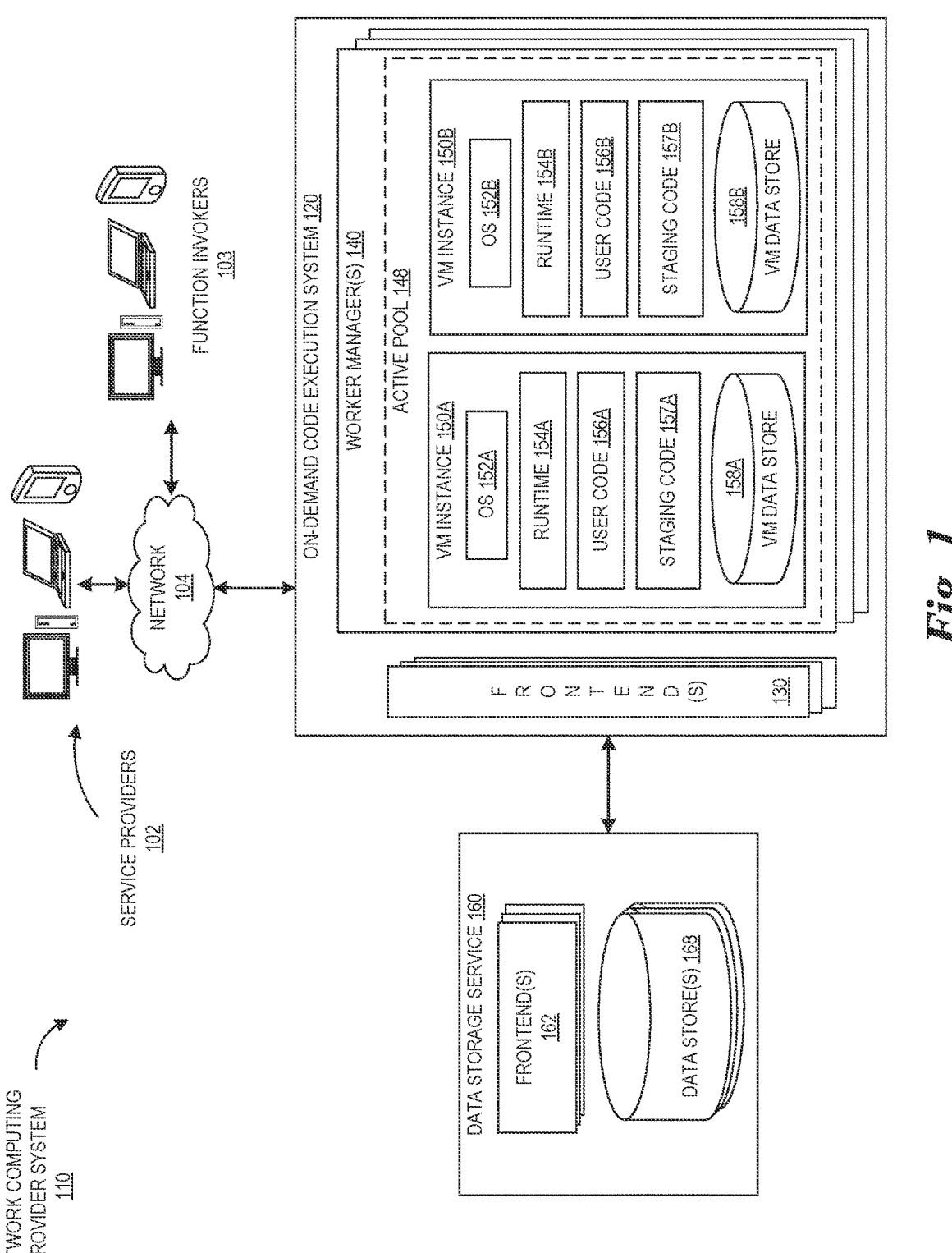
FIG. 1 is a block diagram of an illustrative computing environment in in which an on-demand code execution system can operate in conjunction with a data storage system according to some embodiments.

The present disclosure relates to taking actions based on identifying invokers of functions executing at an on-demand code execution system. During execution of an on-demand function invoked by a function invoker, an on-demand code execution system may communicate with a service provider. Through this communication, the service provider may provide computing services to the function invoker—a customer of the service provider—via the on-demand code execution system in connection with execution of the on-demand function. In this scenario, the on-demand execution system can identify the service provider as a first-level customer; in turn, the service provider can offer services via the on-demand code execution system to service provider customers, which can be the function invokers (e.g., first-level customers of the service provider, and second-level customers of the on-demand execution system). To allow the service provider to take different actions based on the identity of the invoker of the function executing on the on-demand code execution system, the service provider may first provide to the function invoker—prior to on-demand function invocation—identity information to use when invoking functions at the on-demand code execution system. The on-demand code execution system may then provide the identity information to the service provider in the form of, for example, an internet protocol (IP) address of the device executing the function, a Hypertext Transfer Protocol (HTTP) header, or a Transmission Control Protocol (TCP) header.

INTRODUCTION

Some data centers may include a number of interconnected computing systems to provide computing resources to users of the data center. To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request compute resources from such a data center, including single computing devices or a configuration of networked computing devices, and be provided with varying numbers of virtual machine resources.

Some data centers include an on-demand code execution system, sometimes referred to as a serverless function execution system. Generally described, on-demand code execution systems enable execution of arbitrary user-designated function code, without requiring the user to create, maintain, or configure an execution environment (e.g., a physical or virtual machine) in which the function code is executed. For example, whereas conventional computing services often require a user to provision a specific device (virtual or physical), install an operating system on the device, configure application settings, define network interfaces, and so on, an on-demand code execution system may enable a user to submit code and may provide to the user an application programming interface (API) that, when used, enables the user to request execution of the function code. Upon receiving a call through the API, the on-demand code execution system may dynamically generate an execution environment for the code, provision the environment with the code, execute the code, and provide a result. Thus, an on-demand code execution system can remove a need for a user to handle configuration and management of environments for code execution. Due to the flexibility of on-demand code execution system to execute arbitrary function code, such a system can be used to create a variety of network services. For example, such a system could be used to create a "micro-service," a network service that implements a small number of functions (or only one function), and that interacts with other services to provide an application. In the context of on-demand code execution systems, the instance of function code executing to provide such a service is often referred to as an "invoked function," or simply as an "invoke" or "function" for brevity.

A service provider may be allocated functions (e.g., functions provided to customers) by the on-demand code execution system. Moreover, the service provider may build functions (e.g., custom functions created by service providers) via the on-demand code execution system. The services of the service provider may be accessed by function invokers via these allocated and/or built functions, where in some cases the function invokers may be considered customers of the service provider. The service provider may provide the function invokers instructions of how to invoke functions at the on-demand code execution system (e.g., through different computing devices, etc.). When the function invokers invoke functions at the on-demand code execution system, the on-demand code execution system may execute these functions to completion and, in some cases, provide the function invoker results of the execution. As the on-demand code execution system executes code associated with a function, calls outside the on-demand code execution system (e.g., to the service provider) may be made which could affect processing of the function. Due to the distributed and virtualized nature of the on-demand code execution system that is executing on behalf of the function invokers, it can be impractical or impossible for the service provider to determine which function invoker has invoked the function for which on-demand code execution system is calling, and/or requesting from, the service provider to provide services. Thus, the service provider may be unable to provide customized services or otherwise execute differently depending upon the source of the function invocation request to the on-demand code execution system.

Some aspects of the present disclosure address some or all of the issues noted above, among others, through an improved on-demand code execution system that provides service provider information regarding—or from which the service provider can determine the identity of—a function invoker during execution of functions invoked by the function invokers. In some embodiments, a network computing provider system in which the on-demand code execution system operates may provide a unique range of IP addresses to a service provider such that the service provider may provision individual IP address from the range to individual function invokers. For example, a service provider may request, from the on-demand code execution system or some other service of the network computing provider system, a range of IP addresses for its function invokers and may be provided an IP range (e.g., "2600:1f13:fc2 . . . . FROM 3000-5999"). The service provider may assign each of its function invokers any subset of IP addresses from the range (e.g., any IP address with a suffix between 3000-5999). In one specific example, the service provider may assign a certain function invoker a specific IP address (e.g., "2600:1f13:fc2 . . . 3445") and the function invoker can include that IP address in function invocation requests to the on-demand code execution system. The service provider may save a mapping of which IP addresses have been assigned to which function invokers. When a function invoker invokes a certain function at the on-demand code execution system, the function invoker can provide its assigned IP address. The on-demand code execution system may provision a container (e.g., dynamically build up a virtual machine) with that specific IP address to execute the invoked function (e.g., the container is provisioned with the "2600:1f13:fc2 . . . 3445" IP address, and will execute functions invoked by the specific function invoker to which the service provider has assigned that IP address). Any request made by the container to a service provider outside of the on-demand code execution system will be seen as a request from the IP address with which the container has been provisioned.

Advantageously, execution of a function by a container created specifically with an IP address assigned in the manner described above may now be tracked back to the specific function invoker that invoked the function, because the IP address of the container has been uniquely associated with the specific function invoker. Therefore, when the on-demand code execution system makes a request to the service provider during execution of a function invoked by a function invoker, the request will come from the container provisioned with the IP address previously assigned to the specific function invoker who invoked the function. As such, the service provider may now take action based on the identity of the function invoker by determining the IP address from which the request has been received (e.g., the IP address of the container), and mapping that IP address back to the function invoker to which the IP address was previously assigned. For example, the service provider may now take different actions related, but not limited to, security, firewall, throttling, auditing, and routing, among other actions. These actions are described in more detail below.

Additional aspects of the present disclosure relate to providing an identifier associated with a function invoker to a service provider through header information of a request (e.g., HTTP header or TCP header). When a function invoker invokes a function at the on-demand code execution system, the function invoker may provide identity information or other information (e.g., as a parameter of function invocation). The on-demand code execution system may include a subsystem, such as a micromanager, which maintains a mapping of which function invoker has invoked which function executing on which container, and which identity information was included in the function invocation request. When a container initiates a request to a service provider outside of the on-demand code execution system during execution of an invoked function, the micromanager (or another subsystem, such as a proxy) populates the identity information into a header (e.g., either an HTTP header or a TCP header) of the request. For example, a header may be populated with identification information of a function invoker that invoked a function, and the request with the header populated in this manner is then sent to the service provider. For an HTTP request (e.g., to a service provider that determines function invoker identity or otherwise operates at a Level 7 network layer), a connection manager of the micromanager may populate an HTTP header with identification information of a function invoker which invoked a function. Alternatively, for a TCP request (e.g., to service provider that determines function invoker identity or otherwise operates at a Level 4 network layer), the micromanager may use an extended Berkeley Packet Filter (eBPF) to populate a TCP header with identification information of a function invoker which invoked a function.

Thus, when the on-demand code execution system communicates with the service provider during execution of functions invoked by function invokers, the on-demand code execution system may provide the identification of the function invoker who invoked the function through header information. As such, the service provider may now take action based on the particular function invoker on whose behalf the on-demand code execution system is executing the function. Moreover, since information is being provided in a header of a request from the on-demand code execution system (e.g., rather than using IP addresses assigned to function invokers), information may be provided for purposes other than only the identification of the function invoker. For example, tokens, encrypted information, messages, and the like may be included in the header. The service provider may now use the header information to take different actions including, but not limited to, security, firewall, throttling, auditing, and routing, among other actions. These actions are described in more detail below.

Various aspects of the disclosure will be described with regard to certain examples and embodiments, which are intended to illustrate but not limit the disclosure. Although aspects of some embodiments described in the disclosure will focus, for the purpose of illustration, on particular examples of on-demand functions, IP address formats, header types, and on-demand code execution system configurations, the examples are illustrative only and are not intended to be limiting. In some embodiments, the techniques described herein may be applied to additional or alternative types of on-demand functions, IP address formats, header types, and on-demand code execution system configurations. Additionally, any feature used in any embodiment described herein may be used in any combination with any other feature or in any other embodiment, without limitation.

Example Network Environment

An on-demand code execution system may provide a network-accessible service enabling users to submit or designate computer-executable source code—also referred to herein as "function code," or simply as "code" for brevity—to be executed by virtual machine instances on the on-demand code execution system. Each set of function code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). In some cases, the on-demand code execution system may enable users to directly trigger execution of a task based on a variety of potential events, such as transmission of an API or specially formatted hypertext transport protocol ("HTTP") packet to the on-demand code execution system. The on-demand code execution system can therefore execute any specified executable code "on-demand." without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of executing virtual environments (e.g., virtual machine instances and/or containers) that are ready for use as soon as a request to execute a task is received. Due to the pre initialized nature of these virtual environments, delay (sometimes referred to as latency) associated with executing the task code (e.g., instance and language runtime startup time) can be significantly reduced, often to sub 100 millisecond levels. Illustratively, the on-demand code execution system may maintain a pool of virtual environments on one or more physical computing devices, where each virtual machine instance has one or more software components (e.g., operating systems, language runtimes, libraries, etc.) loaded thereon. When the on-demand code execution system receives a request to execute program code (a "task"), the on-demand code execution system may select a virtual environment for executing the program code of the user based on the one or more computing constraints related to the task (e.g., a required operating system or runtime) and cause the task to be executed on the selected virtual machine instance. The tasks can be executed in isolated containers that are created on the virtual machine instances, or may be executed within a virtual machine instance isolated from other virtual machine instances acting as environments for other tasks. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) can be significantly reduced.

As used herein, the term "virtual machine instance" is intended to refer to an execution of software or other executable code that emulates hardware to provide an environment or platform on which software may execute (an example "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments (e.g., other virtual environments or physical environments) are also possible. For example, tasks or other processes may be executed within a software "container." which provides a runtime environment without itself providing virtualization of hardware. Containers may be implemented within virtual machines to provide additional security, or may be run outside of a virtual machine instance.

FIG. 1 is a block diagram of an illustrative operating environment in which a network computing provider system 110 operates to enable function invokers 103 to submit a request, through service provider 102, invocation of user-defined code by an on-demand code execution system 120.

By way of illustration, service provider 102 and function invokers 103 are shown in communication with the network computing provider system 110, including a desktop computer, laptop, and a mobile phone. In general, the service provider 102 and function invokers 103 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like.

Generally described, the data storage service 160 can operate to enable clients to read, write, modify, and delete data, such as files, objects, blocks, or records, each of which represents a set of data associated with an identifier (an "object identifier" or "resource identifier") that can be interacted with as an individual resource. For example, an object may represent a single file submitted by a client device 102 (though the data storage service 160 may or may not store such an object as a single file). This object-level interaction can be contrasted with other types of storage services, such as block-based storage in which data is manipulated at the level of individual blocks or database storage in which data manipulation may occur at the level of tables or the like.

The data storage service 160 illustratively includes one or more frontends 162, which provide an interface (a command-line interface (CLIs), application programing interface (APIs), or other programmatic interface) through which client devices 102 can interface with the service 160 to configure the service 160 on their behalf and to perform I/O operations on the service 160.

The service provider 102, function invokers 103, data storage service 160, and on-demand code execution system 120 may communicate via one or more communication networks, which may include any wired network, wireless network, or combination thereof. For example, network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long-Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 120—also referred to as an on-demand code execution service—includes one or more frontends 130 which enable interaction with the on-demand code execution system 120. In an illustrative embodiment, the frontends 130 serve as a "front door" to the other services provided by the on-demand code execution system 120, enabling users the service provider 102 and/or function invokers 103 to provide, request execution of, and view results of computer executable code. The frontends 130 include a variety of components to enable interaction between the on-demand code execution system 120 and other computing devices. For example, each frontend 130 may include a request interface providing service provider 102 and/or function invokers 103 with the ability to upload or otherwise communicate user-specified code to the on-demand code execution system 120 and to thereafter request execution of that code. In one embodiment, the request interface communicates with external computing devices (e.g., service provider 102 and/or function invokers 103, frontend 162, etc.) via a graphical user interface (GUI), CLI, or API. The frontends 130 process the requests and make sure that the requests are properly authorized. For example, the frontends 130 may determine whether the user associated with the request is authorized to access the user code specified in the request.

References to user code as used herein may refer to any program code (e.g., a program, routine, subroutine, thread, etc.) written in a specific program language. In the present disclosure, the terms "code." "user code," "function code," and "program code," may be used interchangeably. Such user code may be executed to achieve a specific function, for example, in connection with a particular data transformation developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, or Ruby (or another programming language).

To manage requests for code execution, the frontend 130 can include an execution queue, which can maintain a record of requested task executions. Illustratively, the number of simultaneous task executions by the on-demand code execution system 120 is limited, and as such, new task executions initiated at the on-demand code execution system 120 (e.g., via an API call, via a call from an executed or executing task, etc.) may be placed on the execution queue and processed, e.g., in a first-in-first-out order. In some embodiments, the on-demand code execution system 120 may include multiple execution queues, such as individual execution queues for each user account. For example, users of the network computing system provider 110 may desire to limit the rate of task executions on the on-demand code execution system 120 (e.g., for cost reasons). Thus, the on-demand code execution system 120 may utilize an account-specific execution queue to throttle the rate of simultaneous task executions by a specific user account. In some instances, the on-demand code execution system 120 may prioritize task executions, such that task executions of specific accounts or of specified priorities bypass or are prioritized within the execution queue. In other instances, the on-demand code execution system 120 may execute tasks immediately or substantially immediately after receiving a call for that task, and thus, the execution queue may be omitted.

The frontend 130 can further include an output interface configured to output information regarding the execution of tasks on the on-demand code execution system 120. Illustratively, the output interface may transmit data regarding task executions (e.g., results of a task, errors related to the task execution, or details of the task execution, such as total time required to complete the execution, total data processed via the execution, etc.) to the service provider 102 and/or function invokers 103 or the data storage service 160.

In some embodiments, the on-demand code execution system 120 may include multiple frontends 130. In such embodiments, a load balancer may be provided to distribute the incoming calls to the multiple frontends 130, for example, in a round-robin fashion. In some embodiments, the manner in which the load balancer distributes incoming calls to the multiple frontends 130 may be based on the location or state of other components of the on-demand code execution system 120. For example, a load balancer may distribute calls to a geographically nearby frontend 130, or to a frontend with capacity to service the call. In instances where each frontend 130 corresponds to an individual instance of another component of the on-demand code execution system 120, such as the active pool 148 described below, the load balancer may distribute calls according to the capacities or loads on those other components. Calls may in some instances be distributed between frontends 130 deterministically, such that a given call to execute a task will always (or almost always) be routed to the same frontend 130. This may, for example, assist in maintaining an accurate execution record for a task, to ensure that the task executes only a desired number of times. For example, calls may be distributed to load balance between frontends 130. Other distribution techniques, such as anycast routing, will be apparent to those of skill in the art.

The on-demand code execution system 120 further includes one or more worker managers 140 that manage the execution environments, such as virtual machine instances 150 (shown as VM instance 150A and 150B, generally referred to as a "VM"), used for servicing incoming calls to execute tasks. While the following will be described with reference to virtual machine instances 150 as examples of such environments, embodiments of the present disclosure may utilize other environments, such as software containers. In the example illustrated in FIG. 1, each worker manager 140 manages an active pool 148, which is a group (sometimes referred to as a pool) of virtual machine instances 150 executing on one or more physical host computing devices that are initialized to execute a given task (e.g., by having the code of the task and any dependency data objects loaded into the instance).

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. A task may be associated with permissions encompassing a variety of aspects controlling how a task may execute. For example, permissions of a task may define what network connections (if any) can be initiated by an execution environment of the task. As another example, permissions of a task may define what authentication information is passed to a task, controlling what network-accessible resources are accessible to execution of a task (e.g., objects on the service 160). In one embodiment, a security group of a task is based on one or more such permissions. For example, a security group may be defined based on a combination of permissions to initiate network connections and permissions to access network resources. As another example, the tasks of the group may share common dependencies, such that an environment used to execute one task of the group can be rapidly modified to support execution of another task within the group.

Once a triggering event to execute a task has been successfully processed by a frontend 130, the frontend 130 passes a request to a worker manager 140 to execute the task. In one embodiment, each frontend 130 may be associated with a corresponding worker manager 140 (e.g., a worker manager 140 co-located or geographically nearby to the frontend 130) and thus, the frontend 130 may pass most or all requests to that worker manager 140. In another embodiment, a frontend 130 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. Thus, via operation of the on-demand code execution system 120, tasks may be rapidly executed within an execution environment.

In accordance with aspects of the present disclosure, each VM 150 additionally includes staging code 157 executable to facilitate staging of input data on the VM 150 and handling of output data written on the VM 150, as well as a VM data store 158 accessible through a local file system of the VM 150. Illustratively, the staging code 157 represents a process executing on the VM 150 (or potentially a host device of the VM 150) and configured to obtain data from the data storage service 160 or cache service 170 and place that data into the VM data store 158. The staging code 157 can further be configured to obtain data written to a file within the VM data store 158, and to transmit that data to the data storage service 160 or cache service 170. Because such data is available at the VM data store 158, user code 156 is not required to obtain data over a network, simplifying user code 156 and enabling further restriction of network communications by the user code 156, thus increasing security. Rather, as discussed above, user code 156 may interact with input data and output data as files on the VM data store 158, by use of file handles passed to the code 156 during an execution. In some embodiments, input and output data may be stored as files within a kernel-space file system of the data store 158. In other instances, the staging code 157 may provide a virtual file system, such as a filesystem in userspace (FUSE) interface, which provides an isolated file system accessible to the user code 156, such that the user code's access to the VM data store 158 is restricted.

As used herein, the term "local file system" generally refers to a file system as maintained within an execution environment, such that software executing within the environment can access data as a file, rather than via a network connection. In accordance with aspects of the present disclosure, the data storage accessible via a local file system may itself be local (e.g., local physical storage), or may be remote (e.g., accessed via a network protocol, like NFS, or represented as a virtualized block device provided by a network-accessible service). Thus, the term "local file system" is intended to describe a mechanism for software to access data, rather than physical location of the data.

The VM data store 158 can include any persistent or non-persistent data storage device. In one embodiment, the VM data store 158 is physical storage of the host device, or a virtual disk drive hosted on physical storage of the host device. In another embodiment, the VM data store 158 is represented as local storage, but is in fact a virtualized storage device provided by a network accessible service. For example, the VM data store 158 may be a virtualized disk drive provided by a network-accessible block storage service. In some embodiments, the data storage service 160 may be configured to provide file-level access to objects stored on the data stores 168, thus enabling the VM data store 158 to be virtualized based on communications between the staging code 157 and the service 160. For example, the data storage service 160 can include a file-level interface providing network access to objects within the data stores 168 as files. The file-level interface may, for example, represent a network-based file system server (e.g., a network file system (NFS)) providing access to objects as files, and the staging code 157 may implement a client of that server, thus providing file-level access to objects of the service 160.

In some instances, the VM data store 158 may represent virtualized access to another data store executing on the same host device of a VM instance 150. For example, an active pool 148 may include one or more data staging VM instances (not shown in FIG. 1), which may be co-tenanted with VM instances 150 on the same host device. A data staging VM instance may be configured to support retrieval and storage of data from the service 160 (e.g., data objects or portions thereof, input data passed by client devices 102, etc.), and storage of that data on a data store of the data staging VM instance. The data staging VM instance may, for example, be designated as unavailable to support execution of user code 156, and thus be associated with elevated permissions relative to instances 150 supporting execution of user code. The data staging VM instance may make this data accessible to other VM instances 150 within its host device (or, potentially, on nearby host devices), such as by use of a network-based file protocol, like NFS. Other VM instances 150 may then act as clients to the data staging VM instance, enabling creation of virtualized VM data stores 158 that, from the point of view of user code 156A, appear as local data stores. Beneficially, network-based access to data stored at a data staging VM can be expected to occur very quickly, given the co-location of a data staging VM and a VM instance 150 within a host device or on nearby host devices.

While some examples are provided herein with respect to use of IO stream handles to read from or write to a VM data store 158, IO streams may additionally be used to read from or write to other interfaces of a VM instance 150 (while still removing a need for user code 156 to conduct operations other than stream-level operations, such as creating network connections). For example, staging code 157 may "pipe" input data to an execution of user code 156 as an input stream, the output of which may be "piped" to the staging code 157 as an output stream. As another example, a staging VM instance or a hypervisor to a VM instance 150 may pass input data to a network port of the VM instance 150, which may be read-from by staging code 157 and passed as an input stream to the user code 157. Similarly, data written to an output stream by the task code 156 may be written to a second network port of the instance 150A for retrieval by the staging VM instance or hypervisor. In yet another example, a hypervisor to the instance 150 may pass input data as data written to a virtualized hardware input device (e.g., a keyboard) and staging code 157 may pass to the user code 156 a handle to the IO stream corresponding to that input device. The hypervisor may similarly pass to the user code 156 a handle for an IO stream corresponding to a virtualized hardware output device, and read data written to that stream as output data. Thus, the examples provided herein with respect to file streams may generally be modified to relate to any IO stream.

The data storage service 160 and on-demand code execution system 120 are depicted in FIG. 1 as operating in a distributed computing environment including several computer systems that are interconnected using one or more computer networks (not shown in FIG. 1). The data storage service 160 and on-demand code execution system 120 could also operate within a computing environment having a fewer or greater number of devices than are illustrated in FIG. 1. Thus, the depiction of the data storage service 160 and on-demand code execution system 120 in FIG. 1 should be taken as illustrative and not limiting to the present disclosure. For example, the on-demand code execution system 120 or various constituents thereof could implement various Web services components, hosted or "cloud" computing environments, or peer to peer network configurations to implement at least a portion of the processes described herein. In some instances, the data storage service 160 and on-demand code execution system 120 may be combined into a single service. Further, the data storage service 160 and on-demand code execution system 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the data storage service 160 and on-demand code execution system 120 are illustrated as connected to the network 104. In some embodiments, any of the components within the data storage service 160 and on-demand code execution system 120 can communicate with other components of the on-demand code execution system 120 via the network 104. In other embodiments, not all components of the data storage service 160 and on-demand code execution system 120 are capable of communicating with other components of the virtual environment. In one example, only the frontends 130 and 162 (which may in some instances represent multiple frontends) of the on-demand code execution system 120 and the data storage service 160, respectively, may be connected to the network 104, and other components of the data storage service 160 and on-demand code execution system 120 may communicate with other components of the environment via the respective frontends 130 and 162.

While some functionalities are generally described herein with reference to an individual component of the data storage service 160 and on-demand code execution system 120, other components or a combination of components may additionally or alternatively implement such functionalities. Thus, the specific configuration of elements within FIG. 1 is intended to be illustrative.

Figure 2:
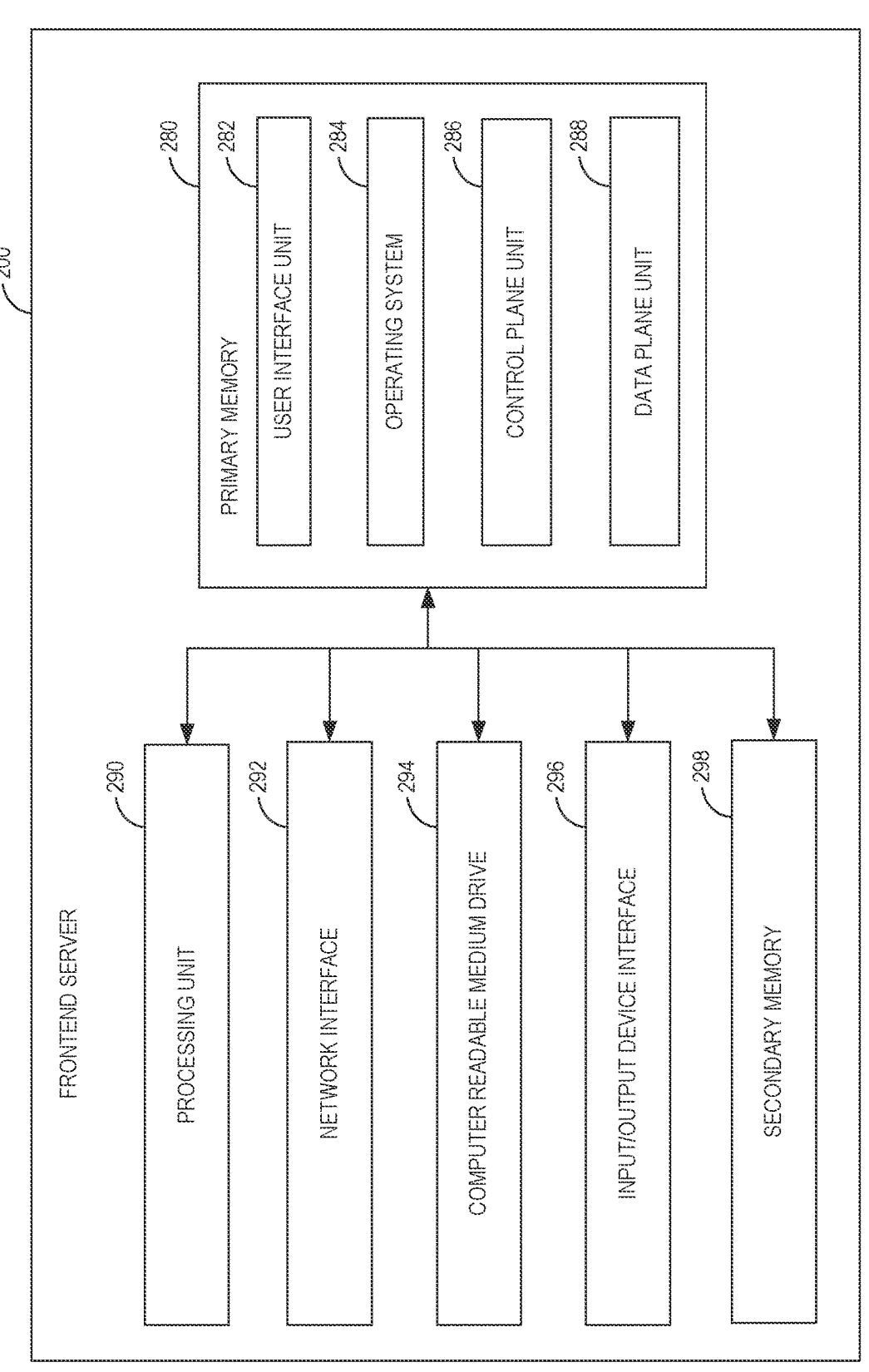
FIG. 2 is a block diagram of an illustrative computing system configured to manage function invocations in the on-demand code execution system according to some embodiments.

FIG. 2 depicts a general architecture of a frontend server 200 computing device implementing a frontend 130 of FIG. 1. The general architecture of the frontend server 200 depicted in FIG. 2 includes an arrangement of computer hardware and software that may be used to implement aspects of the present disclosure. The hardware may be implemented on physical electronic devices, as discussed in greater detail below. The frontend server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the frontend server 200 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 or secondary memory 298 and further provide output information for an optional display (not shown) via the input/output device interface 296. The input/output device interface 296 may also accept input from an optional input device (not shown).

The primary memory 280 or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the worker manager 140, with a higher speed but lower total capacity than secondary memory 298.

The primary memory 280 may store an operating system 284 that provides computer program instructions for use by the processing unit 290 in the general administration and operation of the frontend server 200. The memory 280 may further include computer program instructions and other information for implementing aspects of the present disclosure. For example, in one embodiment, the memory 280 includes a user interface unit 282 that generates user interfaces (or instructions therefor) for display upon a computing device, e.g., via a navigation or browsing interface such as a browser or application installed on the computing device. The memory 280 may include a control plane unit 286 and data plane unit 288 each executable to implement aspects of the present disclosure. Illustratively, the control plane unit 286 may include code executable to enable definition or submission of function code to be executed. The data plane unit 288 may illustratively include code enabling handling of I/O operations on the data storage service 160, including retrieving data sets, generating data references to be used by other functions to access the data sets, caching the data sets, etc.

The frontend server 200 of FIG. 2 is one illustrative configuration of such a device, of which others are possible. For example, while shown as a single device, a frontend server 200 may in some embodiments be implemented as multiple physical host devices. Illustratively, a first device of such a frontend server 200 may implement the control plane unit 286, while a second device may implement the data plane unit 288.

While described in FIG. 2 as a frontend server 200, similar components may be utilized in some embodiments to implement other devices shown in the environment of FIG. 1. For example, a similar device may implement a worker manager 140, as described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

Actions Based on IP Address of Function Invoker

Figure 3A:
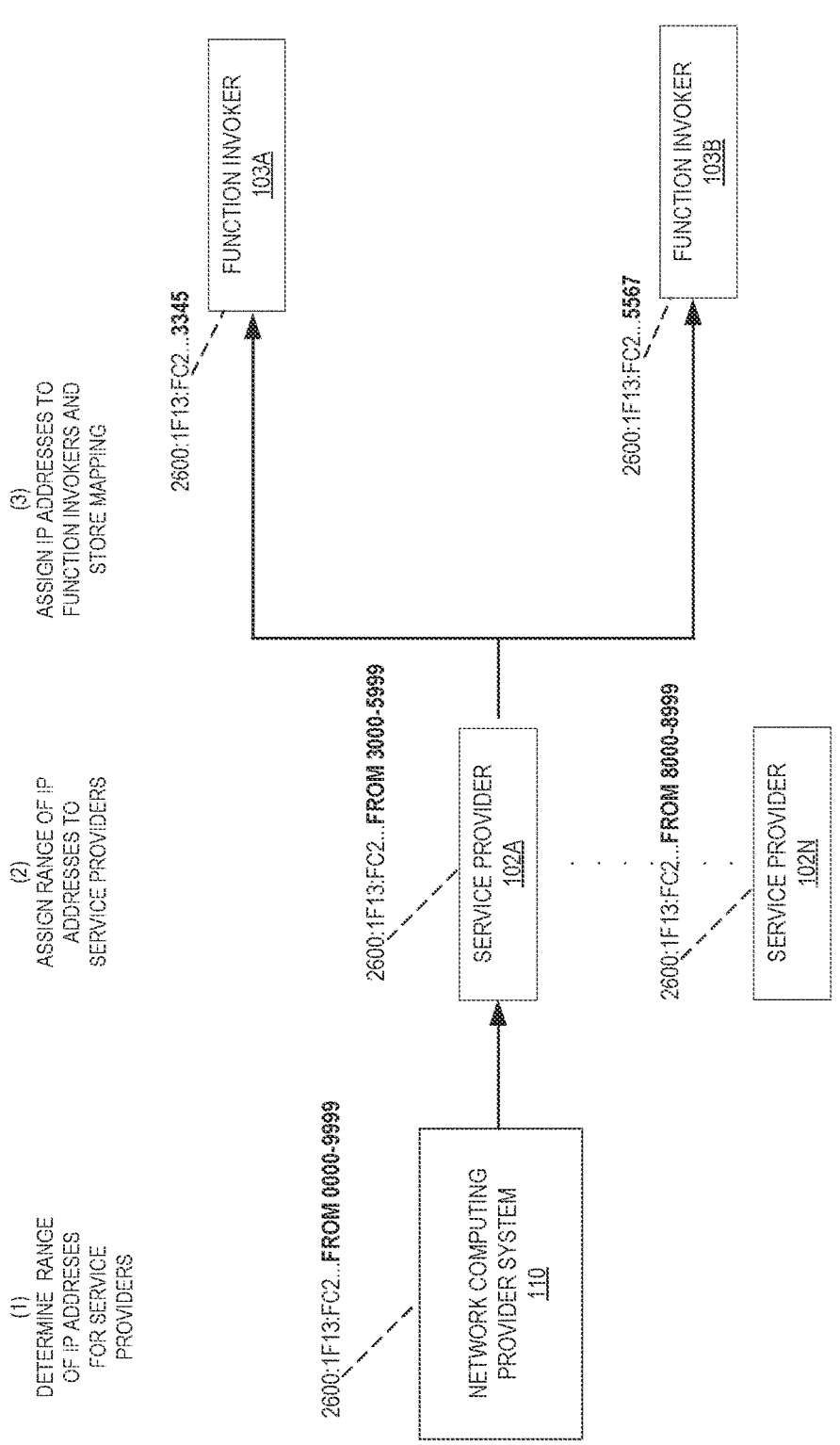
FIGS. 3A-3B are block diagrams illustrating provisioning of internet protocol (IP) addresses from a network computing provider system to service providers and function invokers, and using the IP addresses during execution of on-demand functions according to some embodiments.

FIG. 3A is a block diagram illustrating provisioning of IP addresses from the network computing provider system 110 to the service providers 102 and the function invokers 103. The network computing provider system 110 may provide a service provider 102 with a predetermined range of IP addresses to assign to one or more function invokers 103. Each service provider 102 may provide functions for invocation to one or more function invokers 103. By assigning an IP address to a function invoker 103, the provision of computing services by the service provider 102 during execution of the functions may be dictated by the identity of the function invoker 103.

At (1), the network computing provider system 110 determines a range of IP addresses with the network computing provider system 110 to assign to its service providers (e.g., contains the partial location "2600:1f13:fc2" and is from the range of 0000-9999). In this setup, the network computing provider system 110 may ensure that every service provider 102 is within the range of 0000-9999. These IP addresses may be, for example, Internet Protocol version 4 (IPv4), Internet Protocol version 6 (IPv6), or another suitable protocol.

At (2), the network computing provider system 110 determines which service provider 102 to assign what range of IP addresses. The network computing provider system 110 can assign a single, or multiple, IP addresses to a single service provider. If there are multiple service providers, the network computing provider system 110 can assign different IP addresses, or different ranges of IP addresses, to different service providers. For example, as shown, the network computing provider system 110 assigned the service provider 102A the IP address range of 3000-5999 where the range of IP addresses begin with "2600:1f13:fc2 . . . "; and the service provider 102N (the nth number of service providers) the IP address range of 6000-8999 where the range of IP addresses begin with "2600:1f13:fc2 . . . ". These ranges are within the determined range for the service providers at (1). The network computing provider system 110 can provide IP address data representing the assigned IP address ranges to the respective service providers.

At (3), the service provider 102A takes its IP address range and assigns them to function invokers 103. As shown, the service provider 102A assigns function invoker 103A IP address "2600:1f13:fc2 . . . 3345" and assigns function invoker 103B IP address "2600:1f13:fc2 . . . 5567". To assign the IP addresses to the function invokers, the service provider 102A can send IP address data representing the assigned IP addresses to the respective function invokers. The service providers 102 may then store mapping data representing these IP address to function invoker assignments as mappings in a datastore, such as, but not limited to, a database or big data framework. The service providers 102 may then use this mapping during execution of an invoked function to take actions when at least the network computing provider system 110 communicates with it.

Figure 3B:
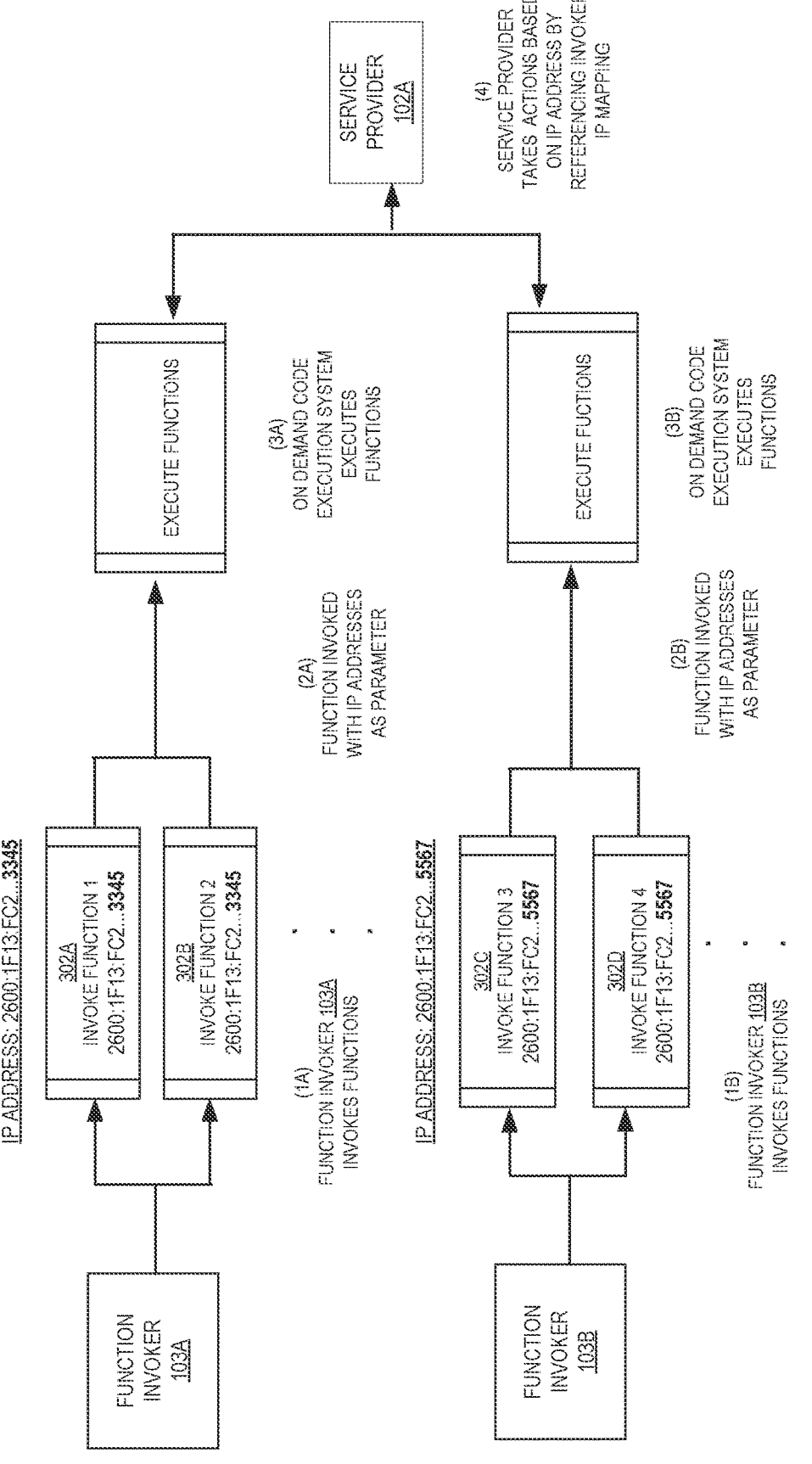

FIG. 3B is a block diagram illustrating the function invokers 103 invoking functions with an assigned IP address associated with that invocation. The service providers 102 can take actions based on the invocation and IP address. During execution of invoked functions (e.g., invoked by the function invokers 103) with assigned IP addresses, the on-demand code execution system 120 may communicate requests to a service provider 102 associated with the execution. The service provider 102 may then take actions based on the IP address of the computing resource of the on-demand code execution system 120 (and previously assigned to the function invoker) such as, but not limited to, routing, auditing, throttling, firewalling, security decisions, among other actions.

At (1A), the function invoker 103A can invoke functions with the IP address "2600:1f13:fc2 . . . 3345" assigned to it by the service provider 102A. As shown in 302A, the function invoker 103A invoked FUNCTION 1 with the IP address "2600:1f13:fc2 . . . 3345" as a parameter of the function invocation request. At 302B the same function invoker 103A invokes FUNCTION 2 with the IP address location "2600:1f13:fc2 . . . 3345" as a parameter of the invocation request.

At (1B), the function invoker 103B can invoke functions with a different IP address than function invoker 103A. In other words, the function invoker 103B may invoke functions with the IP address "2600:1f13:fc2 . . . 5567" (instead of "2600:1f13:fc2 . . . 3345") assigned by the service provider 102A. At 302C the function invoker 103B invokes FUNCTION 3 with the IP address location "2600:1f13:fc2 . . . 5567" as a parameter of the function invocation request. At 302D the function invoker 103B invokes FUNCTION 4 with the IP address "2600:1f13:fc2 . . . 5567" as a parameter of the function invocation request.

At 2(A), the on-demand code execution system 120 receives FUNCTION 1 and FUNCTION 2 invoked with the IP address "2600:1f13:fc2 . . . 3345". In response to invocation requests for these functions, the on-demand code execution system 120 may setup and/or provision a new container (e.g., a virtual machine) to associate with the IP address "2600:1f13:fc2 . . . 3345" during the execution of these functions. Alternatively, the on-demand code execution system 120 may use an existing container associated with the IP address "2600:1f13:fc2 . . . 3345", which the on-demand code execution system 120 may have previously setup and/or provisioned from a prior execution. Therefore, the on-demand code execution system 120 may keep track of execution processing of FUNCTION 1 and/or FUNCTION 2 because a container specifically assigned to the IP address "2600:1f13:fc2 . . . 3345" may be used for the execution of these functions.

At 2(B), the on-demand code execution system 120 receives FUNCTION 3 and FUNCTION 4 invoked with the IP address "2600:1f13:fc2 . . . 5567" as a parameter of the invokes. In response to invocation requests for these functions, the on-demand code execution system 120 may setup and/or provision a new container to associate with the IP address "2600:1f13:fc2 . . . 5567" during the execution of these functions. Alternatively, the on-demand code execution system 120 may use an existing container associated with the IP address "2600:1f13:fc2 . . . 5567", which the on-demand code execution system 120 may have previously setup and/or provisioned from a prior execution. Therefore, the on-demand code execution system 120 may keep track of execution processing of FUNCTION 3 and/or FUNCTION 4 because a container specifically assigned to the IP address "2600:1f13:fc2 . . . 5567" may be used for the execution of these functions.

As shown at 2(A) and 2(B), execution of functions of different function invokers 103 may be differentiated. For example, when the function invoker 103A invokes functions, the execution of these functions are differentiated from execution of functions associated with the function invoker 103B, because the on-demand code execution system 120 may provision a container specifically for the IP address of "2600:1f13:fc2 . . . 3345" for the function invoker 103A, whereas the on-demand code execution system 120 may provision a container specifically for the IP address of "2600:1f13:fc2 . . . 5567" for the function invoker 103B different from the function invoker 103A.

At 3(A), the on-demand code execution system 120 can execute FUNCTION 1 and FUNCTION 2 in the container provisioned with the IP address "2600:1f13:fc2 . . . 3345". At 3(B), the on-demand code execution system 120 can execute FUNCTION 3 and FUNCTION 4 in the container provisioned with the IP address "2600:1f13:fc2 . . . 5567".

At (4), the service provider 102A takes actions on the execution of functions based at least on IP addresses associated with those functions. The on-demand code execution system 120 can communicate with the service provider 102A during execution of functions invoked by the function invokers 103 in order to use services provided by, or made available through, the service provider 102A. During a communication related to a function, the on-demand code execution system 120 can include the IP address of a function invoker as a part of that communication to the service provider 102A. For example, because the function is being executed by a container (e.g., a virtual machine) that has been provisioned with the IP address assigned to the function invoker, communications from the container can include the IP address as the source IP address in the communication. The on-demand code execution system 120 can permit the communication to proceed to the service provider 102A without obfuscating or substituting the IP address (e.g., without performing network address translation). This can allow the service provider 102A the ability to determine which of the function invokers 103 invoked the function. More specifically, when the service provider sees the virtual machine's IP address as the source IP address of a communication, the service provider knows that the service provider previously assigned that same IP address to the function invoker. This is because, as described above, the service providers 102 may store a mapping of IP addresses to function invokers 103 to at least determine the function invoker 103 that invoked the function. The service provider 102A may take actions based on an IP address (e.g., which can refer to a particular function invoker) as shown in, but are not limited to, the following examples.

The service provider 102A may create a firewall for functions based at least on IP addresses assigned to the functions by the service provider 102A. In other words, the service provider 102A may use an IP address to control what network traffic associated with which of the function invokers 103 is permitted to get to and/or from other endpoints within the service provider 102A in particular, the network computing provider system 110 in general, or the wider internet at large. For example, the on-demand code execution system 120 may communicate to the service provider 102A that FUNCTION 1 (along with the IP address "2600: 1f13:fc2 . . . 3345" associated with it) is requesting execution of an operation on a first server (e.g., public server with non-confidential information) or a second server (e.g., private server with confidential information). The service provider 102A may determine whether to permit the operation, forward the communication, or the like by application of one or more firewall rules to the source IP address of the communication and therefore, by extension, the identity of the function invoker.

Moreover, the service provider 102A may perform network throttling for functions based at least on IP addresses assigned to the functions by the service provider 102A. In other words, the service provider 102A may use IP address to control the network bandwidth available to functions of the function invokers 103. For example, the on-demand code execution system 120 may communicate to the service provider 102A during execution of FUNCTION 3 (along with the source IP address "2600:1f13:fc2 . . . 5567" associated with the communication). The service provider 102A may determine, via reference to a mapping table, that that the function execution is intended for the function invoker 103B. Moreover, the service provider 102A may determine to apply throttling to any execution from the function invoker 103B (e.g., due to the function invoker 103B using excessive bandwidth). Therefore, the service provider 102A may introduce synthetic latency or perform some other throttling operation to the execution of FUNCTION 3 (e.g., wait three additional seconds before delivering a response to the on-demand code execution system).

Further, the service provider 102A may perform security actions for functions based at least on IP addresses assigned to the functions by the service provider 102A. For example, the service provider 102A may use an IP address to determine which of the function invokers 103 can access, through a function invoked at the on-demand code execution system 120, which data or functionality provided by the service provider 102A. The on-demand code execution system 120 may communicate to the service provider 102A during execution of FUNCTION 2 (along with the source IP address "2600:1f13:fc2 . . . 3345" associated with the communication) and request the service provider 102A to access data or execute an operation. The service provider 102A may determine, via reference to a mapping table and the source IP address ("2600:1f13:fc2 . . . 3345"), that that the request is on behalf of—or otherwise associated with— the function invoker 103A. If the function invoker 103A is not permitted to access the data or otherwise execute the operation, then the service provider 102A may communicate to the on-demand code execution system 120 that the request is denied.

The service provider 102A may perform auditing and/or logging actions for functions based at least on IP addresses assigned to the functions by the service provider 102A. In other words, the service provider 102A may use an IP address to determine which function information should be tracked for auditing purposes. For example, the on-demand code execution system 120 may communicate to the service provider 102A information (e.g., date and time the invocation was made, external calls made outside the on-demand code execution system 120, etc.), and/or the service provider 102A may generate information during execution in response to requests from the on-demand code execution system 120, and the like. The service provider 102A may determine that the information is associated with function invoker 103B by referencing a mapping table and finding out that the source IP address "2600:1f13:fc2 . . . 5567" of communications from the on-demand code execution system 120 maps to the function invoker 103B. As such, the service provider 102A may store the function execution information for auditing and/or logging purposes.

Moreover, the service provider 102A may perform routing actions for functions based at least on IP addresses assigned to the functions by the service provider 102A. For example, the on-demand code execution system 120 may communicate to the service provider 102A a request during execution of FUNCTION 3 (along with the IP address "2600:1f13:fc2 . . . 5567" associated with the communication). The communication may be intended for an endpoint within the service provider 102A, within the network computing provider system 110, or in anther network or the internet. The service provider 102A may apply one or more routing rules based on the source IP address of the communication, and therefore implicitly based on the identity of the function invoker 103B. Illustratively, if operations initiated by the function invoker 103B should be executed on a non-production server (e.g., because the function request is not supposed to affect production data), the service provider 102A may route the communication to a non-production sever. In some embodiments, the service provider 102A may determine that this communication is related to the function invoker 103B by referencing a mapping table and finding out that the IP address "2600:1f13:fc2 . . . 5567" maps to the function invoker 103B. The network computing provider system 110 may then apply one or more routing rules based explicitly in the identity of the function invoker 103B.

FIG. 4 illustrates example routine 400 for the service provider 102A to acquire a range of IP addresses within the network computing provider system 110, assign the IP addresses to function invokers, and then take actions based on IP addresses during function processing.

The routine 400 begins at block 402. At block 402, the service provider 102A requests a range of IP addresses from the network computing provider system 110. As described herein, the range of IP addresses may be specific to service provider 102A, and may be within the address space of the network computing provider system 110 or a particular portion thereof (e.g., a particular virtual private cloud).

At block 404, the service provider 102A receives the range of IP addresses from the network computing provider system 110. As described above, the IP address range received by the service provider 102A may be in either IPv4 or IPv6. For example, the service provider 102A may receive the IP address range with a prefix of "2600:1f13:fc2 . . . " and all suffixes from 3000-5999 from the network computing provider system 110.

At block 406, the service provider 102A determines which of the function invokers 103 are to be assigned which IP addresses. For example, the service provider 102A may assign the function invoker 103A the IP address of "2600: 1f13:fc2 . . . 3345" and assign the function invoker 103B the IP address of "2600:1f13:fc2 . . . 5567". In some embodiments, assignment of an IP address to a function invoker may be a multi-step process. For example, the service provider 102A may generate and store mapping data to memorialize the assignment of a particular IP address of the range of IP addresses (or subset of the range of IP addresses) to a particular function invoker. The service provider 102A may also send IP address data to the function invoker. The IP address data may include the IP address that the function invoker 103A is to provide to the on-demand code execution system 120 with function invocation requests.

At block 408, the service provider 102A receives a communication from the on-demand code execution system 120. As stated above, the communication from the on-demand code execution system 120 may be associated with an execution of a function where the communication may be accompanied by a source IP address. For example, the packet or packets representing the request may include a source IP address of a particular computing resource of the on-demand code execution system 120, such as a virtual machine executing an on-demand function on behalf of a function invoker.

At decision 410, the service provider 102A makes a determination as to which one of the function invokers 103 is associated with the source IP address of the communication from the on-demand code execution system 12 received at block 408. As described above, the service provider 102A may in some embodiments determine which of the function invokers 103 the IP address belongs to by referencing a mapping table.

At block 412A, if the service provider 102A determines that the IP address is associated with a 1st function invoker, then the service provider 102A may take actions based on function executions being associated with the 1st function invoker. At block 412B, if the service provider 102A determines that the IP address is associated with an nth function invoker, then the service provider 102A may take actions based on function executions being associated with the nth function invoker. As described herein, the service provider 102A may take actions related, but not limited to, firewalling, throttling, security, routing, auditing, and logging.

Although FIG. 4 illustrates a determination of a function invoker 103 based on a source IP address of a communication from the on-demand code execution system 120, in some embodiments the determination may be implicit rather than an explicit step. For example, a service provider 102 may be configured to perform an action (e.g., apply different routing, firewalling, or security rules, or implement throttling, auditing, or logging operations) on an IP address basis, without an explicit determination of which function invoker was previously assigned the IP address. In such cases, the routing/firewalling/security rules or throttling/auditing/logging operations may be separately configured based on the identity of the function invoker and the assignment of the IP address to the function invoker. However, when processing a communication from the on-demand code execution service, there may not be any additional function invoker identity determination step. In this way, service providers 102 can leverage the efficiencies of low-level networking rules and systems and also provide customized processing based on function invoker identity.

Actions Based on Identification of Function Invoker

Figure 5:
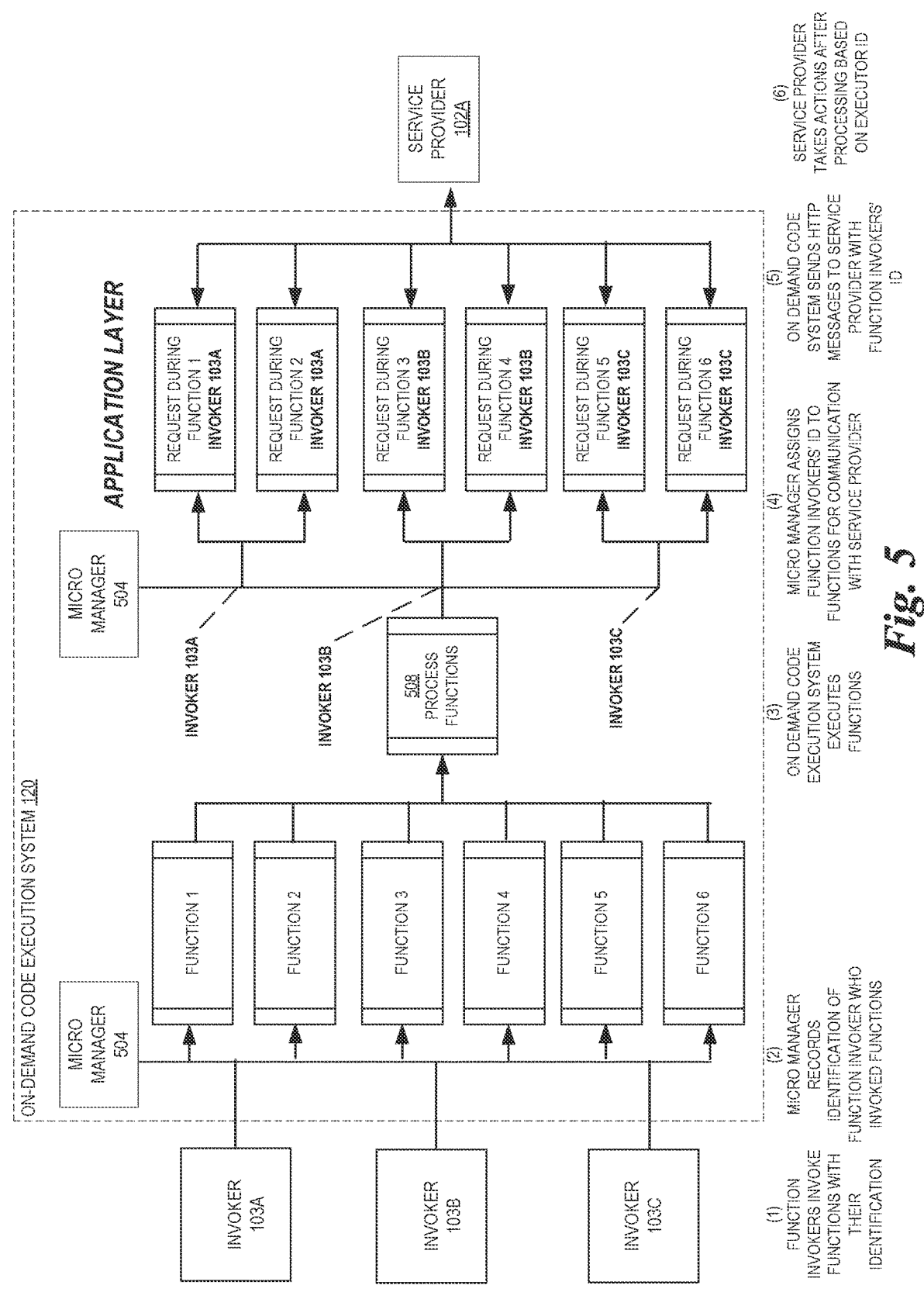
FIG. 5 is a block diagram illustrating processing of on-demand functions and providing services to the computing resources executing the on-demand functions based on identification of function invokers at the network application layer according to some embodiments.

FIG. 5 is a block diagram illustrating processing of on-demand functions and providing services to the computing resources executing the on-demand functions based on identification of function invokers at the network application layer (e.g., level 7 network layer) according to some embodiments. During execution of an invoked function, the on-demand code execution system 120 can communicate with the service provider 102A via a hypertext transport protocol ("HTTP") message and provide an identifier associated with a function invoker within a header of that HTTP message. The service provider 102A can receive that HTTP message and take actions based on the identification of the function invoker.

At (1), the function invokers 103 invoke functions to be executed at the on-demand code execution system 120. As shown in FIG. 5, function invokers 103A, 103B, and 103C invoke functions. The function invoker 103A invokes FUNCTION 1 and FUNCTION 2 and can add an identification of itself as an invoke parameter to each of those invocation requests. The function invoker 103B invokes FUNCTION 3 and FUNCTION 4 and can add an identification of itself as an invoke parameter to each of those invocation requests. The function invoker 103C invokes FUNCTION 5 and FUNCTION 6 and can add an identification of itself as an invoke parameter to each of those invocation requests. These invocations are received at on-demand code execution system 120 for execution.

At (2), a component of the on-demand code execution system 120 in receipt of function invocation requests, such as a micro manager 504, can identify each virtual machine (or other computing resource) executing an invoked function. The micro manager 504 can also determine the corresponding function invoker identifiers associated with each function invocation request, and store them for use in communicating with the service provider 102A during execution of the invoked functions. For example, as described below, when a virtual machine (or other computing resource of the on-demand code execution system 120) sends a message such as an HTTP message to the service provider 102A during execution of a function, the micro manager 504 (or some another computing resource of the on-demand code execution system 120, such as a proxy server or connection manager) can add the identifier of the function invoker who invoked the function as a part of the HTTP header information.

At (3), the on-demand code execution system 120 executes the functions invoked by function invokers 103. At (4), a micro manager 504 assigns an identifier of a function invoker 103 to an HTTP header of an HTTP message. For example, a connection manager associated with the micro manager 504 may add custom header components to an HTTP message (e.g., an identifier of the function invoker who invoked the function) associated with execution of an invoked function, such that the on-demand code execution system 120 can send that HTTP message to the service provider 102A. In other words, when the on-demand code execution system 120 may want to send a message to the service provider 102A regarding execution of an invoked function (e.g., a request for the service provider 102A to perform an operation during execution of FUNCTION 1 by the on-demand code execution system 120), it may send an HTTP message with the identification of the function invoker (e.g., INVOKER 103B) in the header of that HTTP message.

At (5) the on-demand code execution system 120 sends HTTP messages (with the function invoker identification as header information) to the service provider 102A. The on-demand code execution system 120 can provide the service provider 102A an identification of the function invoker 103 who invoked a function in an HTTP header (associated with that function) thereby allowing the service provider 102A the ability to determine which of the function invokers 103 invoked the function.

Figure 6:
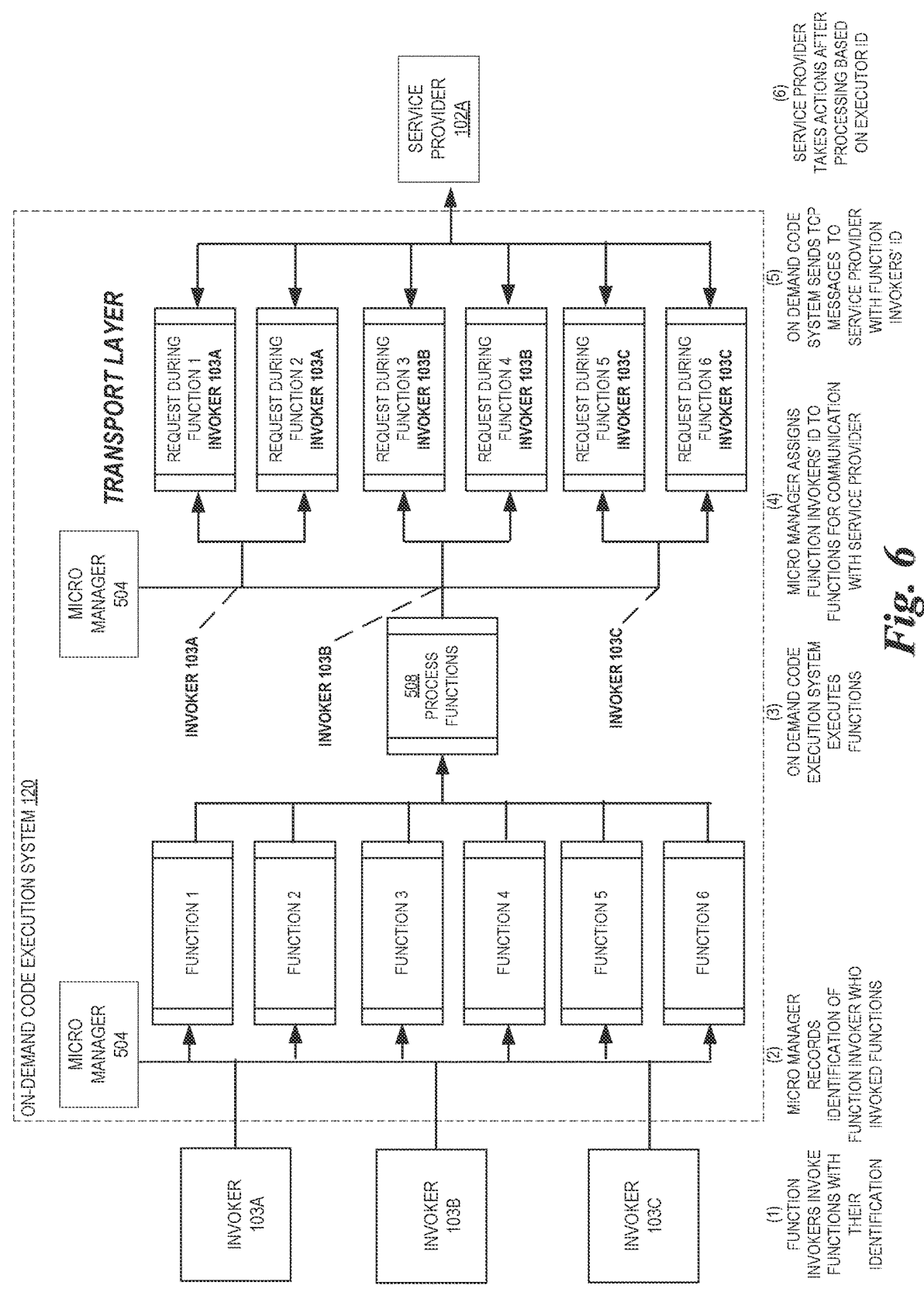
FIG. 6 is a block diagram illustrating processing of on-demand functions and providing services to the computing resources executing the on-demand functions based on identification of function invokers at the network transport layer according to some embodiments.

It should be noted that in FIGS. 3-4, an IP address was associated with an invocation of a function such that the service provider 102A may make decisions at the network level based on those IP addresses. In FIGS. 5-7, the identification of the function invokers 103 are made at the header level of either an HTTP message or Transmission Control Protocol (TCP) message. For example, in addition to the examples below, the service provider 102A may receive information that is in addition to an identification of the function invoker 103, such as custom tokens, encrypted information, messages, and/or any other components that may be shared via an HTTP message or a TCP message.

At (6), the service provider 102A may take actions based on parsing an HTTP header to determine an identifier of the function invoker 103 as shown in, but not limited to, the following examples.

For example, the service provider 102A may apply one or more firewall rules for functions based at least on an identification of a function invoker 103. In other words, the service provider 102A may use an identification of the function invoker 103 to control what network traffic associated with which function invokers is allowed to get to/from which endpoints of service provider 102A, the network computing provider system 110 generally, other networks, or the internet.

Moreover, the service provider 102A may perform network throttling for functions based at least on an identification of a function invoker 103. In other words, the service provider 102A may control the speed of network traffic associated with functions of the function invokers 103, as described above with respect to IP address-based throttling.

Further, the service provider 102A may perform security actions for functions based at least on an identification of a function invoker 103. For example, the service provider 102A may use an identification of the function invoker 103 to determine which data may be accessed and/or which operations may be performed during execution of a function invoked by the function invoker 103, as described above with respect to IP address-based security.

The service provider 102A may perform auditing and/or logging actions for functions based at least on an identification of a function invoker 103. In other words, the service provider 102A may use a function invoker identification to determine which function information should be tracked for auditing and/or logging purposes, as described above with respect to IP address-based auditing and logging.

Moreover, the service provider 102A may perform routing actions for functions based at least on an identification of a function invoker 103. For example, the on-demand code execution system 120 may send to the service provider 102A an HTTP message request during execution of a function invoked by the function invoker 103. The service provider 102A may implement routing rules based on the identity of the function invoker determined from the HTTP header, as described above with respect to IP address-based routing.

FIG. 6 is a block diagram illustrating processing of on-demand functions and providing services to the computing resources executing the on-demand functions based on identification of function invokers at the network transport layer (e.g., level 4 network layer) according to some embodiments. During execution of an invoked function by one of the function invokers 103, an identification of a function invoker 103 may be provided in a header of a TCP message associated with an invoked function. During execution of the invoked function, the service provider 102A may take actions based on the identification of the function invoker 103.

At (1), the function invokers 103 invoke functions to be executed at the on-demand code execution system 120. As shown in FIG. 6, function invoker 103A, 103B, and 103C invoke functions. The function invoker 103A can invoke FUNCTION 1 and FUNCTION 2 and add an identification of itself as an invoke parameter to each of those invocation requests. The function invoker 103B can invoke FUNCTION 3 and FUNCTION 4 and add an identification of itself as an invoke parameter to each of those invocation requests. The function invoker 103C can invoke FUNCTION 5 and FUNCTION 6 and add an identification of itself as an invoke parameter to each of those invocation requests. These invocations are received at on-demand code execution system 120 for execution.

At (2), a component of the on-demand code execution system 120 in receipt of function invocation requests, such as a micro manager 504 can identify each virtual machine (or other computing resource) executing an invoked function. The micro manager 504 can also determine the corresponding function invoker identifiers associated with each function invocation request, and store them for use in communicating with the service provider 102A during execution of the invoked functions. For example, as described below, when a virtual machine (or other computing resource of the on-demand code execution system 120 sends a message such as a TCP message to the service provider 102A during execution of a function, an extended Berkeley Packet Filter (eBPF) associated with the micro manager 504 may add custom header components to a TCP message associated with execution of an invoked function.

At (3), the on-demand code execution system 120 executes the functions invoked by function invokers 103. At (4), the micro manager 504 assigns an identifier of an invoker 103 to a TCP header of a TCP message. As stated above, an eBPF associated with the micro manager 504 may be used to add custom header components to an TCP message (an identification of the function invoker). In other words, when the on-demand code execution system 120 may want to send a message to the service provider 102A regarding execution of an invoked function (e.g., a request for the service provider 102A to perform an operation during execution of FUNCTION 1), it may send a TCP message with the identification of the function invoker in the header of that TCP message.

At (5) the service provider 102A sends TCP messages (with the function invoker identification as header information) to the service provider 102A. The on-demand code execution system 120 can send TCP messages to the service provider 102A during execution of functions invoked by the function invokers 103 (e.g., the function invoker 103A, the function invoker 103B, or the function invoker 103C). In a TCP message related to a function, the on-demand code execution system 120 can provide the service provider 102A an identification of the function invoker 103 who invoked a function in a TCP header. This can allow the service provider 102A the ability to determine which of the function invokers 103 invoked the function.

At (6), the service provider 102A may take actions based on parsing the identifier of the function invoker 103 as shown in, but are not limited to, a plurality of examples which are described at (6) of FIG. 5 (in this case the use of the HTTP header is replaced by the use of a TCP header, all the examples provided in FIG. 5 should apply outside of the difference in network layer protocol), reference should be made to those descriptions which are applicable in this case.

FIG. 7 is a flow diagram of an illustrative routine for taking actions based on identifying function invokers during on-demand function processing according to some embodiments.

The routine 700 begins at block 702. At block 702, the on-demand code execution system 120 receives a function invocation from a function invoker 103 along with additional information as a parameter of the invocation. In some embodiments, the additional information may be or include an identification of the function invoker 103. In some embodiments, the additional information may be or include custom tokens, encrypted information, messages, and/or any other components that may be shared via a message header.

At 704, the on-demand code execution system 120 stores (e.g., via micro manager) information identifying the virtual machine or other computing resource executing the invoked function, and the additional information received from the function invoker who invoked the function. At 706, the assigned virtual machine or other computing resource of the on-demand code execution system 120 performs execution of the function. During execution of the function, one or more requests to a service provider may be generated, as described in greater detail above.

At 708, the on-demand code execution system 120 includes the information received from the function invoker 103—or a portion thereof—with the request that is to be sent to the service provider 102. For example, the micro manager, a proxy server, or some other component of the on-demand code execution system 120 assigns an identifier of the function invoker 103 to either an HTTP header or a TCP header. The on-demand code execution system 120 may perform an HTTP header assignment of the identifier when the service provider 102 operates at the L7 network level and therefore can accept HTTP messages. The on-demand code execution system 120 may perform a TCP header assignment of the identifier when the service provider 102 operates at the L4 network level and therefore can accept TCP messages.

At 710, the on-demand code execution system 120 sends messages to the service provider 102 with the identification of the function invoker 103 and/or other information included in a message header. As stated above, if the service provider 102 operates at the L7 network level then the on-demand code execution system 120 may send the service provider 102 an HTTP message with the identifier in the HTTP header. Alternatively, if the service provider 102 operates at the L4 network level then the on-demand code execution system 120 may send the service provider 102 a TCP message with the identifier in the TCP header. The on-demand code execution system 120, upon receipt of the request (e.g., HTTP or TCP) from the on-demand code execution system 120, may perform actions based on the identified function invoker 103. For example, the service provider 102 may perform actions related to throttling, security, routing, among other actions, as described in greater detail above.

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could." "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A network computing provider system comprising:
an on-demand code execution service comprising a first set of one or more computing devices configured to provide on-demand execution of function code;
a plurality of function invokers configured to invoke functions on the on-demand code execution service, wherein a first function invoker of the plurality of function invokers comprises a second set of one or more computing devices; and
a plurality of service providers configured to provide computing services via the on-demand code execution service, wherein a first service provider of the plurality of service providers comprises a third set of one or more computing devices, and wherein the first service provider is configured to:
obtain a range of internet protocol (IP) addresses within the network computing provider system, wherein the range of IP addresses is obtained by only the first service provider;
determine an IP address of the range of IP addresses to be assigned to the first function invoker;
send IP address data to the first function invoker, wherein the IP address data represents the IP address assigned to the first function invoker;
store mapping data representing assignment of the IP address to the first function invoker;
receive, from the on-demand code execution service, a communication associated with a function invoked on the on-demand code execution service, wherein the communication comprises a source IP address associated with a virtual environment executing the function on a computing device of the first set of one or more computing devices;
determine, using the mapping data, that the source IP address is the IP address assigned to the first function invoker; and
take one or more actions in response to the communication based at least in part on the IP address being assigned to the first function invoker.

2. The network computing provider system of claim 1, wherein the first function invoker is configured to send a function invocation request to the on-demand code execution service, wherein the function invocation request comprises the IP address and a request to execute the function, and wherein the IP address is different than a second source IP address of the first function invoker.

3. The network computing provider system of claim 2, wherein the on-demand code execution service is configured to:
provision a virtual environment with the IP address in response to the function invocation request; and
cause the virtual environment to execute the function, wherein the virtual environment sends the communication during execution of the function.

4. The network computing provider system of claim 2, wherein the on-demand code execution service is configured to:
in response to the function invocation request, identify a virtual environment provisioned with the IP address; and cause the virtual environment to execute the function, wherein the virtual environment sends the communication during execution of the function.

5. A computer-implemented method comprising:

as implemented by a computing system comprising one or more computer processors configured to execute specific instructions:

receiving, by a service provider, internet protocol (IP) address data representing a range of IP addresses available to be assigned to function invokers;

assigning, by the service provider, an IP address of the range of IP addresses to a function invoker, wherein the function invoker is to provide the IP address to an on-demand code execution service in function invocation requests made by the function invoker to the on-demand code execution service;

storing, by the service provider, mapping data representing assignment of the IP address to the function invoker;

receiving, from the on-demand code execution service, a communication associated with a function invoked on the on-demand code execution service, wherein the communication is associated with a source IP address; and executing, by the service provider, one or more actions based at least in part on identifying, using the stored mapping data, that the source IP address corresponds to the IP address assigned to the function invoker.

6. The computer-implemented method of claim 5, further comprising sending, by the function invoker, a function invocation request to the on-demand code execution service, wherein the function invocation request comprises the IP address and a request to execute the function, and wherein the IP address is different than a second source IP address of the function invoker.

7. The computer-implemented method of claim 6, further comprising:

provisioning, by the on-demand code execution service, a virtual environment with the IP address in response to the function invocation request; and causing the virtual environment to execute the function, wherein the virtual environment sends the communication during execution of the function.

8. The computer-implemented method of claim 6, further comprising:

identifying, by the on-demand code execution service in response to the function invocation request, a virtual environment provisioned with the IP address; and causing the virtual environment to execute the function, wherein the virtual environment sends the communication during execution of the function.

9. The computer-implemented method of claim 5, wherein executing the one or more actions comprise application of a firewall rule to the communication from the on-demand code execution service based on the source IP address of the communication being the IP address assigned to the function invoker.

10. The computer-implemented method of claim 5, further comprising determining that the function invoker has used a threshold amount of network bandwidth, wherein executing the one or more actions comprises applying bandwidth throttling to functions invoked by the function invoker on the on-demand code execution service.

11. The computer-implemented method of claim 5, wherein executing the one or more actions comprises:

applying a security rule to the communication from the on-demand code execution service based on the source IP address of the communication being the IP address assigned to the function invoker; and preventing access to a computing resource based on applying the security rule to the communication.

12. The computer-implemented method of claim 5, wherein executing the one or more actions comprises:

applying a security rule to the communication from the on-demand code execution service based on the source IP address of the communication being the IP address assigned to the function invoker; and permitting access to a computing resource based on applying the security rule to the communication.

13. The computer-implemented method of claim 5, wherein executing the one or more actions comprises auditing network activity of the function invoker based on the source IP address of the communication being the IP address assigned to the function invoker.

14. The computer-implemented method of claim 5, wherein executing the one or more actions comprises logging activity associated with execution of the function based on the source IP address of the communication being the IP address assigned to the function invoker.

15. The computer-implemented method of claim 5, wherein executing the one or more actions comprises routing the communication to a destination based on the source IP address of the communication being the IP address assigned to the function invoker.

16. A system comprising computer readable memory and one or more processors, wherein the system is configured to:

receive internet protocol (IP) address data representing a range of IP addresses available to be assigned to function invokers;

assign an IP address of the range of IP addresses to a function invoker, wherein the function invoker is to provide the IP address to an on-demand code execution service in function invocation requests made by the function invoker to the on-demand code execution service;

store mapping data representing assignment of the IP address to the function invoker;

receive, from the on-demand code execution service, a communication associated with a function invoked on the on-demand code execution service, wherein the communication is associated with a source IP address; and execute an action based at least in part on identifying, using the stored mapping data, that the source IP address corresponds to the IP address assigned to the function invoker.

17. The system of claim 16, further comprising the function invoker, wherein the function invoker is configured to send a function invocation request to the on-demand code execution service, wherein the function invocation request comprises the IP address and a request to execute the function, and wherein the IP address is different than a second source IP address of the function invoker.

18. The system of claim 17, further comprising the on-demand code execution service, wherein the on-demand code execution service is configured to:

determine whether a virtual environment has been provisioned with the IP address; and cause the virtual environment to execute the function, wherein the virtual environment sends the communication during execution of the function.

19. The system of claim 16, wherein to execute the action, the system is configured to:

determine that the function invoker has used a threshold amount of network bandwidth; and apply bandwidth throttling to functions invoked by the function invoker on the on-demand code execution service.

20. The system of claim 16, wherein to execute the action, the system is configured to apply one of a security rule, firewall rule, or routing rule to the communication from the on-demand code execution service based on the source IP address of the communication being the IP address assigned to the function invoker.

\* \* \* \* \*